(12) United States Patent
Watanabe et al.

(10) Patent No.: US 12,710,338 B2
(45) Date of Patent: Aug. 18, 2026

(54) MANUFACTURING DATA ANALYSIS DEVICE, SYSTEM, AND METHOD

(71) Applicant: KABUSHIKI KAISHA TOSHIBA, Tokyo (JP)

(72) Inventors: Wataru Watanabe, Tokyo (JP); Keisuke Kawauchi, Kawasaki Kanagawa (JP); Takayuki Itoh, Kawasaki Kanagawa (JP); Jumpei Ando, Yokohama Kanagawa (JP); Toshiyuki Ono, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 602 days.

(21) Appl. No.: 18/172,437

(22) Filed: Feb. 22, 2023

(65) Prior Publication Data

US 2024/0094091 A1 Mar. 21, 2024

(30) Foreign Application Priority Data

Sep. 15, 2022 (JP) ................................ 2022-147315

(51) Int. Cl.
*G01M 99/00* (2011.01)

(52) U.S. Cl.
CPC .................................. *G01M 99/00* (2013.01)

(58) Field of Classification Search
None
See application file for complete search history.

(56) References Cited

U.S. PATENT DOCUMENTS 10,521,193 B2 12/2019 Tasaki
11,436,769 B2 9/2022 Watanabe et al.
2005/0251365 A1 11/2005 Matsushita et al.
(Continued)

FOREIGN PATENT DOCUMENTS

JP 4368905 B2 9/2009
JP 4413673 B2 2/2010
(Continued)

OTHER PUBLICATIONS

Japanese Office Action (and an English language translation thereof) dated Sep. 30, 2025, issued in counterpart Japanese Application No. 2022-147315.

*Primary Examiner* — Matthew G Marini
(74) *Attorney, Agent, or Firm* — Holtz, Holtz & Volek PC

(57) ABSTRACT

According to one embodiment, a manufacturing data analysis device includes processing circuitry. The processing circuitry acquires manufacturing data including a manufacturing condition data group and a quality data group. The processing circuitry calculates one or more degrees of influence exerted by first manufacturing condition data included in the manufacturing condition data group on respective pieces of quality data included in the quality data group by analyzing the manufacturing data. The processing circuitry, in a case where one or more degrees of influence satisfy a determination condition, generates output data related to at least one of the first manufacturing condition data, one or more pieces of quality data on which the first manufacturing condition data has exerted the degrees of influence satisfying the determination condition, or the degrees of influence satisfying the determination condition.

27 Claims, 19 Drawing Sheets

(56) References Cited

U.S. PATENT DOCUMENTS

2008/0219544 A1 9/2008 Tazaki et al.
2008/0278495 A1 11/2008 Minamide et al.
2020/0341454 A1* 10/2020 Mizoguchi ............. G05B 23/02
2022/0066429 A1* 3/2022 Takahashi ........ G05B 19/41875
2022/0083033 A1 3/2022 Ando et al.
2022/0100630 A1* 3/2022 Himono ............. G06F 11/3409
2022/0188307 A1 6/2022 Watanabe et al.
2023/0055892 A1 2/2023 Watanabe et al.
2023/0081798 A1 3/2023 Itoh et al.
2023/0244210 A1 8/2023 Kawauchi et al.
2024/0085899 A1 3/2024 Ando et al.

FOREIGN PATENT DOCUMENTS

JP 5014500 B1 6/2012
JP 5186956 B2 2/2013
JP 5866446 B2 1/2016
JP 2017130025 A 7/2017
JP 2021071896 A 5/2021
JP 2022049395 A 3/2022
JP 2022092419 A 6/2022
JP 2023028393 A 3/2023
JP 2023043703 A 3/2023
JP 2023113024 A 8/2023
JP 2024041510 A 3/2024
WO 2015118946 A1 8/2015
WO 2021015093 A1 1/2021

* cited by examiner

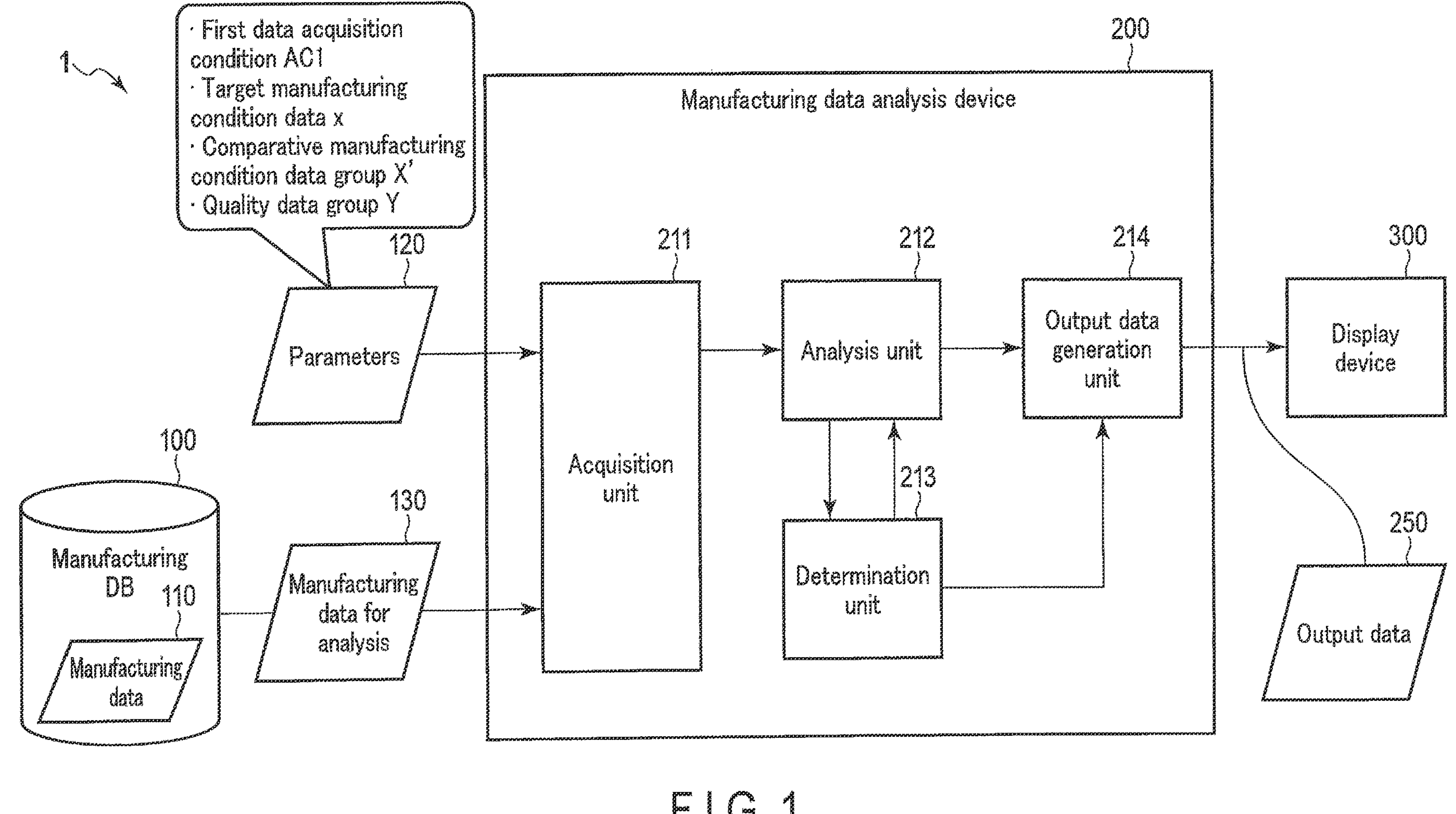
F I G. 1

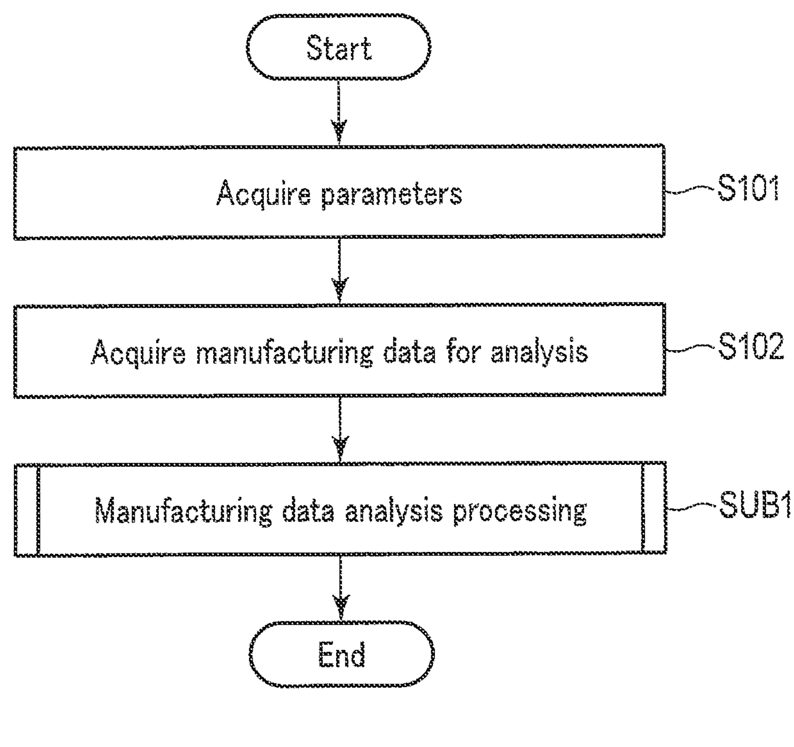
F I G. 2

FIG. 3

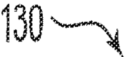

| Product number | Processing/ inspection time | Lot number | Manufacturing condition data C1 | Manufacturing condition data C2 | Manufacturing condition data C3 | Manufacturing condition data C4 | Manufacturing condition data C5 | Quality data C6 | Quality data C7 |
|---|---|---|---|---|---|---|---|---|---|
| XXXX-00001 | 2022/03/03 12:00:00 | XXXX-1 | A-1 | B-1 | 0.1 | A | 6 | 3.048503 | 0.685569195 |
| XXXX-00002 | 2022/03/03 12:00:01 | XXXX-1 | A-2 | B-1 | 0.1 | A | 1 | 6.746109 | 0.811569125 |
| XXXX-00003 | 2022/03/03 12:00:02 | XXXX-1 | A-2 | B-2 | 0.1 | B | 3 | 15.6339 | 0.53926036 |
| XXXX-00004 | 2022/03/03 12:00:04 | XXXX-1 | A-2 | B-2 | 0.1 | B | 2 | 9.064419 | 0.419434119 |
| XXXX-00005 | 2022/03/03 12:00:05 | XXXX-1 | A-2 | B-2 | 0.2 | A | 3 | 9.905023 | 0.980853061 |
| XXXX-00006 | 2022/03/03 12:00:06 | XXXX-1 | A-3 | B-3 | 0.1 | A | 3 | 6.192628 | 0.073292815 |
| XXXX-00007 | 2022/03/03 12:00:07 | XXXX-1 | A-4 | B-3 | 0.1 | A | 2 | 19.02925 | 0.992334542 |
| XXXX-00008 | 2022/03/03 12:00:08 | XXXX-1 | A-4 | B-3 | 0.1 | B | 3 | 5.080155 | 0.779452378 |
| XXXX-00009 | 2022/03/03 12:00:09 | XXXX-2 | A-4 | B-4 | 0.2 | B | 3 | 17.26971 | 0.578714341 |
| XXXX-00010 | 2022/03/03 12:00:10 | XXXX-2 | A-4 | B-4 | 0.2 | A | 5 | 20.73367 | 0.344663241 |
| XXXX-00011 | 2022/03/03 12:00:11 | XXXX-2 | A-5 | B-5 | 0.2 | A | 5 | 2.158379 | 0.644458571 |
| XXXX-00012 | 2022/03/03 12:00:12 | XXXX-2 | A-5 | B-5 | 0.2 | A | 2 | 17.29534 | 0.000000001 |
| XXXX-00013 | 2022/03/03 12:00:13 | XXXX-2 | A-6 | B-6 | 0.1 | B | 3 | 7.844933 | 0.132842057 |
| XXXX-00014 | 2022/03/03 12:00:14 | XXXX-2 | A-6 | B-6 | 0.2 | B | 3 | 1.035118 | 0.736797137 |
| XXXX-00015 | 2022/03/03 12:00:15 | XXXX-2 | A-7 | B-7 | 0.2 | A | 3 | 14.23491 | 0.189504253 |
| XXXX-00016 | 2022/03/03 12:00:16 | XXXX-2 | A-7 | B-7 | 0.2 | B | 3 | 19.02193 | 0.136445121 |
| XXXX-00017 | 2022/03/03 12:00:17 | XXXX-2 | A-8 | B-8 | 0.2 | B | 4 | 18.14844 | 0.999321151 |

(A)

410

| x | Number of products per material | Number of products with $y_i$ determined to be anomalous | Product anomaly rate $v_i$ |
|---|---|---|---|
| Material A | 1000 | 20 | 0.020 |
| Material B | 1000 | 20 | 0.020 |
| Material C | 1000 | 20 | 0.020 |

(B)

420

| x | Number of products per material | Number of products with $y_i$ determined to be anomalous | Product anomaly rate $v_i$ |
|---|---|---|---|
| Material A | 1000 | 3 | 0.003 |
| Material B | 1000 | 50 | 0.050 |
| Material C | 1000 | 7 | 0.007 |

FIG. 5

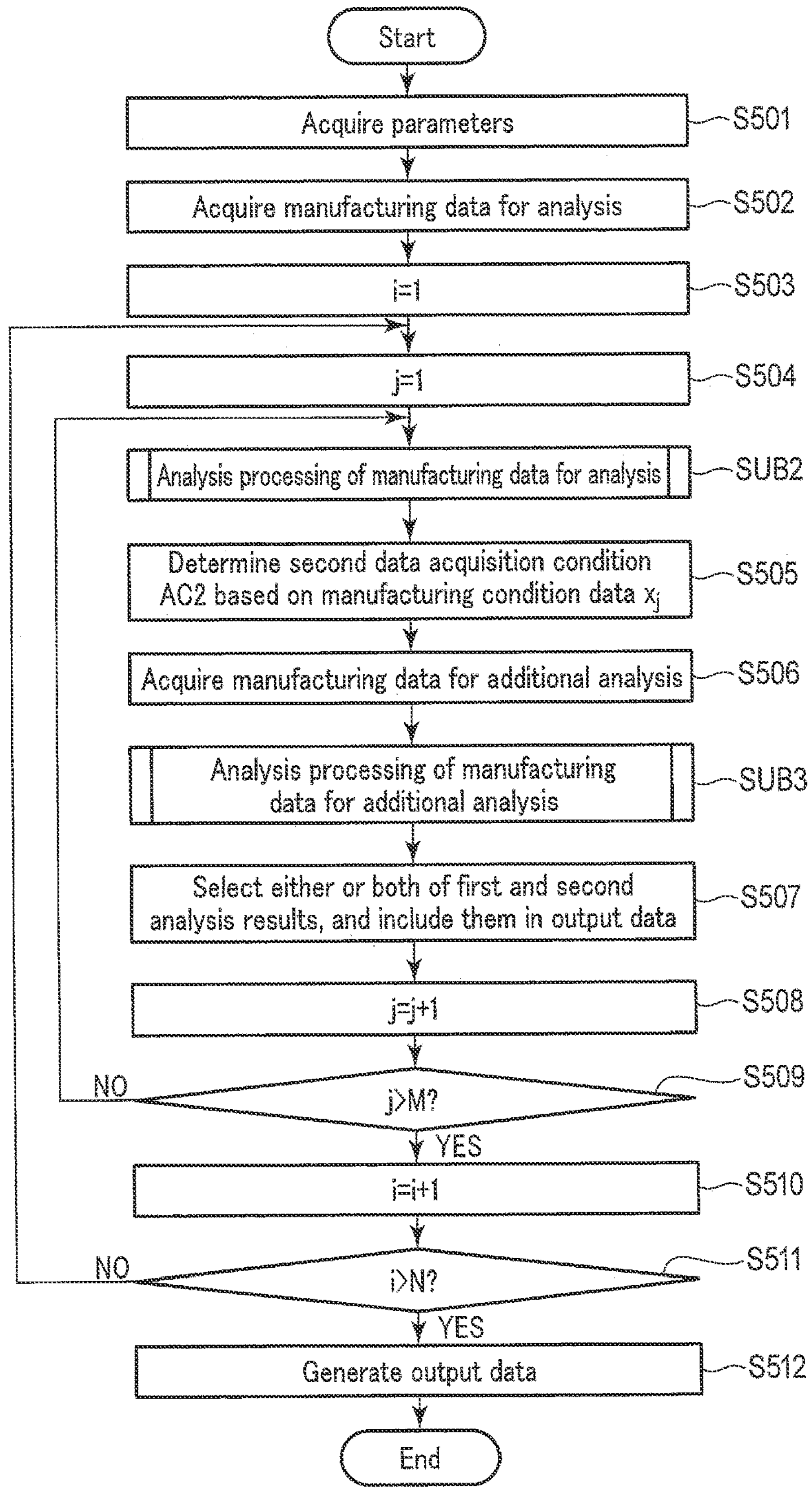
F I G. 14

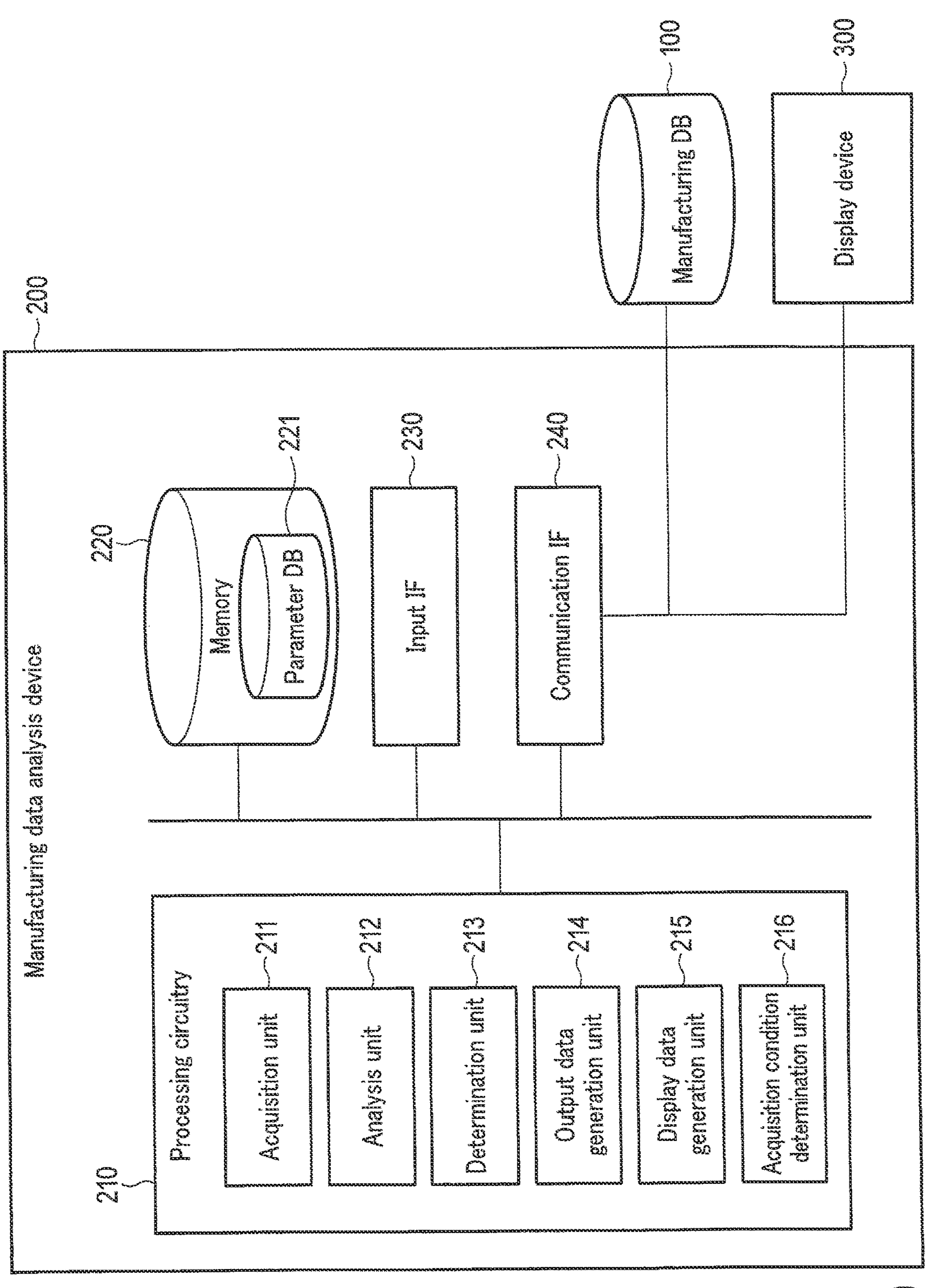
F I G. 19

MANUFACTURING DATA ANALYSIS DEVICE, SYSTEM, AND METHOD

CROSS-REFERENCE TO RELATED APPLICATIONS

This application is based upon and claims the benefit of priority from Japanese Patent Application No. 2022-147315, filed Sep. 15, 2022, the entire contents of which are incorporated herein by reference.

FIELD

Embodiments described herein relate generally to a manufacturing data analysis device, a system, and a method.

BACKGROUND

In the manufacturing industry, early identification of a cause of a particular condition of a product is important. For example, if a product is in an anomalous state that differs from a normal state, early identification of a cause thereof will lead to maintenance and improvement of a yield. Many manufacturing companies detect anomalies in their products and identify causes of the anomalies by monitoring various data (manufacturing data) acquired during a manufacturing process of their products.

The content of manufacturing data varies. For example, data on manufacturing conditions of a product (manufacturing condition data) includes names of materials and devices used in manufacturing of the product. In addition, data on the quality of a product (quality data) includes a size, physical characteristics, and a visual quality of the product.

By monitoring the quality data of products, anomalies in the products and manufacturing devices can be detected. For example, if a value of a piece of quality data differs from a usual value for some products in a group of products manufactured during a certain period of time, those products are suspected to have an anomaly. Furthermore, if, based on manufacturing condition data for the products in question, it is identified that those products were manufactured by a particular device, that device could be a cause of the anomaly.

The more processes and devices required to complete a product, the more data that needs to be monitored. In addition, with the recent development of Internet of Things (IoT) technology, various manufacturing data can be easily acquired. As a result, the number of pieces of manufacturing data has increased significantly, and it is difficult to manually monitor manufacturing data. Therefore, a device to assist a user in monitoring manufacturing data is required.

For example, by monitoring manufacturing data, a user may recognize a yield decrease in a predetermined manufacturing lot and focus on a predetermined manufacturing condition as a cause thereof. In such a case, the user wants to investigate whether or not the predetermined manufacturing condition has influenced the quality of the product. However, when the number (types) of pieces of quality data indicating the product quality is relatively large, it is difficult for the user to investigate an influence of the predetermined manufacturing condition on all the quality data. Furthermore, the user needs to distinguish between an influence of the predetermined manufacturing condition and influences of other manufacturing conditions that differ from the predetermined manufacturing condition, on the same quality data.

BRIEF DESCRIPTION OF THE DRAWINGS

FIG. 1 is a block diagram showing a functional configuration example of a manufacturing data analysis system according to a first embodiment.

FIG. 2 is a flowchart showing an operation example of a manufacturing data analysis device according to the first embodiment.

FIG. 3 is a diagram showing an example of manufacturing data for analysis according to the first embodiment.

FIG. 5 is a diagram showing an example of numerical value data according to the first embodiment.

FIG. 14 is a flowchart showing an operation example of a manufacturing data analysis device according to the third embodiment.

FIG. 19 is a block diagram showing a hardware configuration example of the manufacturing data analysis system according to the first to third embodiments.

DETAILED DESCRIPTION

Figure 4:
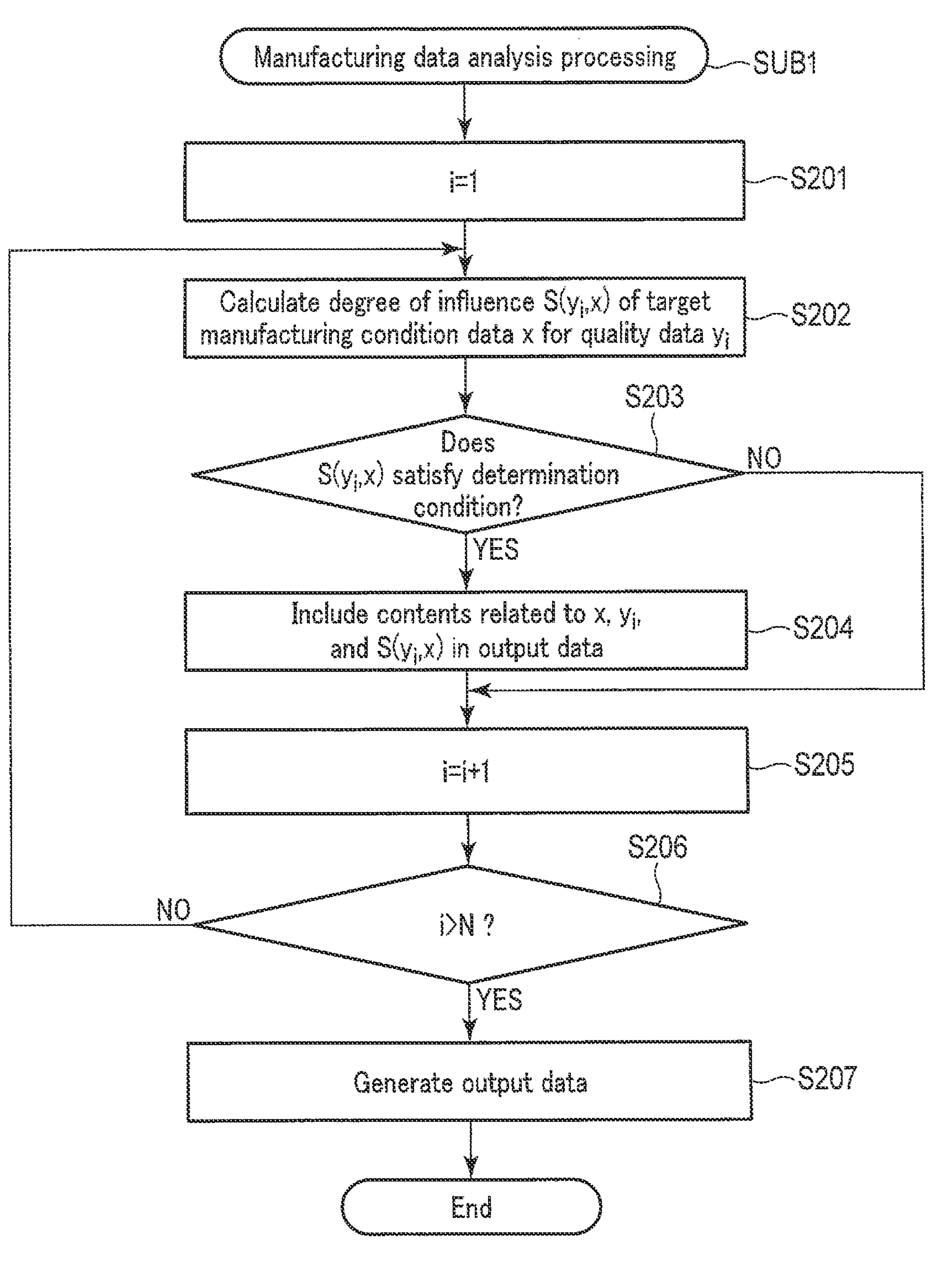
FIG. 4 is a flowchart showing a first example of manufacturing data analysis processing according to the first embodiment.

In general, according to one embodiment, a manufacturing data analysis device includes processing circuitry. The processing circuitry acquires first manufacturing data including a manufacturing condition data group and a quality data group from manufacturing data on a plurality of products under a first acquisition condition. The manufacturing condition data group includes one or more pieces of manufacturing condition data on a value indicating a manufacturing condition for each of the products. The quality data group includes one or more pieces of quality data on a value indicating quality for each of the products. The processing circuitry calculates one or more first degrees of influence exerted by first manufacturing condition data included in the manufacturing condition data group on the respective pieces of quality data included in the quality data group by analyzing the first manufacturing data. The processing circuitry, in a first case where one or more first degrees of influence out of the calculated one or more first degrees of influence satisfy a first determination condition, generates first output data including a content related to at least one of the first manufacturing condition data, one or more pieces of first quality data on which the first manufacturing condition data has exerted the first degrees of influence satisfying the first determination condition, or the first degrees of influence satisfying the first determination condition.

A manufacturing data analysis device, a system, and a method according to embodiments will be described below with reference to the drawings. In the following embodiments, elements assigned with the same reference signs are assumed to perform the same operations, and redundant descriptions thereof will be omitted as appropriate.

First Embodiment

FIG. 1 is a block diagram showing a functional configuration example of a manufacturing data analysis system 1 according to a first embodiment. The manufacturing data analysis system 1 is a system that performs quality control of products by analyzing various data (hereinafter referred to as "manufacturing data") acquired in a manufacturing process of the products. For example, the manufacturing data analysis system 1 detects anomalies in products and identifies causes of the anomalies by analyzing the manufacturing data. The manufacturing data analysis system 1 includes a manufacturing DB 100, a manufacturing data analysis device 200, and a display device 300.

The manufacturing DB 100 is, for example, a relational database management system (RDBMS) that stores manufacturing data 110 provided by manufacturing plants. The manufacturing DB 100 may be, for example, a NoSQL-based database or a file in a predetermined format (e.g., CSV). The manufacturing data 110 stored in the manufacturing DB 100 includes, for example, a few thousand or more items. "DB" means "database".

The manufacturing DB 100 updates the stored manufacturing data 110, for example, in a case where manufacturing data 110 is provided by a manufacturing plant. The manufacturing DB 100 also outputs part or all of the stored manufacturing data 110 as manufacturing data 130 for analysis to the manufacturing data analysis device 200 upon request of the manufacturing data analysis device 200.

The manufacturing data 110 includes information for identifying each individual or group of individuals of products (e.g., ID, serial number), data on manufacturing conditions of a product (hereinafter referred to as "manufacturing condition data"), and data on product quality (hereinafter referred to as "quality data"). These pieces of information or data can include continuous or discrete numerical values and category values.

Information for identifying each individual or group of individuals of products includes, for example, a product number, a time the product is processed or inspected, and a number or string of characters (e.g., lot number, lot ID) indicating a fixed period or fixed number of product units. Note that "lot" is rephrased as "batch". This identification information may be associated with manufacturing condition data and quality data.

The manufacturing condition data includes a plurality of items such as, for example, a name of a material used in a product and a name of a device used to process or assemble the product. The manufacturing condition data may also be information about 5M1E (Man, Machine, Material, Method, Measurement, Environment), more commonly known as the six factors for manufacturing process management. Specifically, the manufacturing condition data may be a name of a processor (Man), a device name, a production line name, and a state of the device (temperature, pressure, etc.) during processing (Machine), an ID and a name of a material or part (Material), a type of processing method or processing program (Method), a name of a device that performed measurement and a measurement point (Measurement), a name of a building, a temperature, and a humidity (Environment). The manufacturing condition data may be anything else that the user determines to be useful for analysis and visualization.

The quality data are measurement values related to, for example, a size (dimensions), a weight, electrical characteristics, and physical characteristics of a product, and include a plurality of items. Some or all of the measurement values of the quality data are measurement values related to inspection items used for product shipment determination. The quality data is not limited to the measurement values themselves, but may also be results of some determination. Specifically, the quality data can be an integer value of a five-level evaluation for whether the product is good or bad, a binary flag that determines whether the product is good or bad (e.g., bad/good), or the like. The quality data may be anything else that the user determines to be useful for analysis and visualization. As a matter of course, the quality data may also be a result of determination by a predetermined determination method (e.g., threshold processing) based on data such as product size, weight, and characteristics.

Parameters 120 are parameters that control an operation of the manufacturing data analysis device 200. The parameters 120 are specified, for example, by a user of the manufacturing data analysis device 200 or an external system, and are input to the manufacturing data analysis device 200 as a file in a predetermined format (e.g., CSV). The parameters 120 may be data names in the manufacturing data 110. In particular, if the manufacturing data 110 is data in a table format, the parameters 120 may be column names of this table. The parameters 120 include a first data acquisition condition AC1, target manufacturing condition data x, a comparative manufacturing condition data group X', and a quality data group Y.

The first data acquisition condition AC1 is a condition for the manufacturing data analysis device 200 to acquire the manufacturing data 130 for analysis from the manufacturing data 110 stored in the manufacturing DB 100. That is, the manufacturing data analysis device 200 acquires specific piece of data corresponding to the first data acquisition condition AC1 as the manufacturing data 130 for analysis from the manufacturing data 110. The first data acquisition condition AC1 is, for example, a specific value related to identification information, manufacturing condition data, or quality data included in the manufacturing data 110, or a range of this value. That is, the first data acquisition condition AC1 may be at least one value included in at least one of the identification information, manufacturing condition data, or quality data. The first data acquisition condition AC1 is also rephrased as a first analysis range.

Firstly, if the first data acquisition condition AC1 is the identification information, the first data acquisition condition AC1 is, for example, a specific product number, a list of specific product numbers, a specific time or time period when a product is processed or inspected, or a specific lot number. Secondly, if the first data acquisition condition AC1 is the manufacturing condition data, the first data acquisition condition AC1 is, for example, a specific material name or device name, or a list of material names or device names. Third, if the first data acquisition condition AC1 is the quality data, the first data acquisition condition AC1 is, for example, a specific value or range related to a size, a weight, electrical characteristics or physical characteristics of a product. As a matter of course, the first data acquisition condition AC1 may be a combination of these pieces of information or data. For example, the first data acquisition condition AC1 is a specific lot number and a specific material name.

Furthermore, the first data acquisition condition AC1 may be a specific value among a plurality of values included in the target manufacturing condition data x. For example, if the target manufacturing condition data x is data related to a specific material name (e.g., a gear), this data will include a plurality of values (e.g., gear A, gear B, and gear C) with different manufacturers, manufacturing dates, processing conditions, characteristics, etc. In this case, the first data acquisition condition AC1 may be one or more specific values (e.g., gear A and gear C) among the plurality of values. Such a first data acquisition condition AC1 is suitable for the manufacturing data analysis device 200 to investigate a degree of influence exerted by a difference in the specific values on quality data $y_i$.

The target manufacturing condition data x is manufacturing condition data that is a subject of the user's attention and is also manufacturing condition data to be analyzed by the manufacturing data analysis device 200. The target manufacturing condition data x is specified, for example, from one of the plurality of pieces of manufacturing condition data included in the manufacturing data 110. Each of the pieces of manufacturing condition data included in the manufacturing data 110 may be sequentially specified as the target manufacturing condition data x each time the manufacturing data analysis device 200 performs analysis processing.

The comparative manufacturing condition data group X' is a group (set) including one or more pieces of manufacturing condition data to be compared with the target manufacturing condition data x. In the comparative manufacturing condition data group X', for example, one or more pieces of manufacturing condition data excluding the target manufacturing condition data x are specified from the plurality of pieces of manufacturing condition data included in the manufacturing data 110. For convenience of explanation, the number of pieces of manufacturing condition data (number of items) included in the comparative manufacturing condition data group X' will be represented as "M" below. Also, each of the pieces of manufacturing condition data (comparative manufacturing condition data) included in the comparative manufacturing condition data group X' will be represented as "$x'_j$" (variable j=1 . . . M; j is an integer).

The target manufacturing condition data x and the comparative manufacturing condition data group X' may be specified from one or more pieces of quality data included in the manufacturing data 110. In general, since a product is manufactured through multiple processes, a quality of the product in a particular process can influence a quality of the product in the next process. That is, this specifying method may be used because the quality of the product in a particular process can be regarded as a manufacturing condition of the product in the next process.

For convenience of explanation, a manufacturing condition data group (set) including the target manufacturing condition data x and the comparative manufacturing condition data group X' will be hereinafter represented as "X". According to the aforementioned definition, the number of pieces of manufacturing condition data (number of items) included in the manufacturing condition data group X is represented as "1+M".

The quality data group Y is a group (set) including one or more pieces of quality data that are targets of investigation of a degree of influence exerted by the target manufacturing condition data x and the comparative manufacturing condition data group X'. In the quality data group Y, one or more pieces of quality data are specified, for example, from the plurality of pieces of quality data included in the manufacturing data 110. For convenience of explanation, the number of pieces of quality data (number of items) included in the quality data group Y will be hereinafter represented as "N". Also, each of the pieces of quality data included in the quality data group Y will be represented as "$y_i$" (variable i=1 . . . N; i is an integer).

The manufacturing data analysis device 200 is a device that analyzes manufacturing data to generate output data 250 including various analysis results. Specifically, the manufacturing data analysis device 200 outputs the output data 250 including a result of analyzing the manufacturing data 130 for analysis acquired from the manufacturing DB 100 to the display device 300. The manufacturing data analysis device 200 includes an acquisition unit 211, an analysis unit 212, a determination unit 213, and an output data generation unit 214.

The acquisition unit 211 acquires the manufacturing data 130 for analysis including the manufacturing condition data group X including the target manufacturing condition data x and the comparative manufacturing condition data group X' and the quality data group Y from the manufacturing data 110 included in the manufacturing DB 100 under the first data acquisition condition AC1 based on the externally input parameters 120. The acquisition unit 211 outputs the manufacturing data 130 for analysis to the analysis unit 212.

The analysis unit 212 analyzes the manufacturing data 130 for analysis input from the acquisition unit 211, and calculates a degree of influence S ($y_i$, x) exerted by the target manufacturing condition data x included in the manufacturing condition data group X on each of the pieces of quality data $y_i$ included in the quality data group Y. According to the aforementioned definition, at most N degrees of influence S ($y_i$, x) are calculated. The analysis unit 212 outputs the degrees of influence S ($y_i$, x) as analysis results to the determination unit 213 and the output data generation unit 214.

The analysis unit 212 also analyzes the manufacturing data 130 for analysis, and calculates contents related to the target manufacturing condition data x and the quality data $y_i$. For example, the analysis unit 212 calculates at least one of a name, a value, a representative value, a statistical value, a histogram, or a scatter diagram related to the target manufacturing condition data x and the quality data $y_i$ as an analysis result. The analysis unit 212 outputs this analysis result to the output data generation unit 214.

In addition, the analysis unit 212 may analyze the quality data $y_i$ included in the quality data group Y of the manufacturing data 130 for analysis, and determine whether or not there is an anomaly for each of a plurality of values included in the quality data $y_i$. Specifically, the analysis unit 212 may determine that, among the values included in the quality data $y_i$, a value whose magnitude is equal to or greater than a predetermined threshold value has an anomaly. The threshold value for this anomaly determination may be any value, for example, a standard value or a management reference value customarily used in product production management. Instead, the threshold value may be based on a mean μ or a standard deviation σ calculated from the values included in the quality data $y_i$.

Further, the analysis unit 212 may determine that there is an anomaly in a product associated with a value of the quality data $y_i$ that is determined to have an anomaly. In addition, the analysis unit 212 may calculate an anomaly rate $v_i$ of products related to the quality data $y_i$ by the formula (number of products determined to have anomaly in quality data $y_i$)/(number of all products to be analyzed). According to this definition, the anomaly rate $v_i$ takes a value $0 \leq v_i \leq 1$, and the closer the anomaly rate $v_i$ is to 1, the greater the number of products determined to have an anomaly in the quality data $y_i$.

If, among one or more degrees of influence S ($y_i$, x) input from the analysis unit 212, one or more degrees of influence S ($y_i$, x) are equal to or greater than a predetermined threshold value, the determination unit 213 determines that this one or more degrees of influence S ($y_i$, x) satisfy a predetermined determination condition. This threshold value can be set to any value by the user of the manufacturing data analysis device 200. Conversely, if, among the one or more degrees of influence S ($y_i$, x), all of the degrees of influence S ($y_i$, x) are less than the predetermined threshold value, the determination unit 213 determines that none of the degrees of influence S ($y_i$, x) satisfies the predetermined determination condition. This determination can be performed for each of the N degrees of influence S ($y_i$, x). The determination unit 213 outputs a determination result of each of the degrees of influence S ($y_i$, x) to the output data generation unit 214.

The output data generation unit 214 generates output data 250 based on the analysis results input from the analysis unit 212 and the determination results input from the determination unit 213. For example, if, among one or more pieces of quality data $y_i$ included in the quality data group Y, there is one or more pieces of quality data $y_i$ on which the target manufacturing condition data x has exerted a degree of influence S ($y_i$, x) that satisfies a predetermined determination condition, the output data generation unit 214 generates the output data 250 including a content related to at least one of the target manufacturing condition data x, this quality data $y_i$, or the degree of influence S ($y_i$, x). Specifically, if a determination result to the effect that "a degree of influence S ($y_i$, x) satisfies a predetermined determination condition" is associated with an analysis result of the target manufacturing condition data x and predetermined quality data $y_i$, the output data generation unit 214 may include this analysis result in the output data 250. The output data generation unit 214 outputs the output data 250 to the display device 300.

The output data 250 is data including a result of analysis by the manufacturing data analysis device 200. The output data 250 may be data in a format (e.g., CSV, HTML, XML, JSON) that can be displayed on the display device 300. That is, the output data 250 may be various text data, text files, image data, or image files. Alternatively, the output data 250 may be stored in a dedicated database.

The display device 300 is a device that displays an image based on the output data 250 input from the manufacturing data analysis device 200. For example, if the output data 250 is text data or a text file, the display device 300 may display this data on a text editor. On the other hand, if the output data 250 is image data or an image file, the display device 300 may display this data on a browser or on an image viewer. The display device 300 may also acquire output data 250 stored in a dedicated database from this database and display the output data 250. Furthermore, the display device 300 may convert structured text data (e.g., CSV, JSON) into HTML data or image data by a predetermined method and display the data.

FIG. 2 is a flowchart showing an operation example of the manufacturing data analysis device 200 according to the first embodiment. This operation example can be initiated when the user of the manufacturing data analysis device 200 or an external system inputs the parameters 120 into the manufacturing data analysis device 200.

(Step S101) First, the manufacturing data analysis device 200 acquires, by the acquisition unit 211, a first data acquisition condition AC1, target manufacturing condition data x, a comparative manufacturing condition data group X', and a quality data group Y as the parameters 120.

(Step S102) Next, the manufacturing data analysis device 200 acquires, by the acquisition unit 211, manufacturing data 130 for analysis from the manufacturing data 110 included in the manufacturing DB 100 based on the parameters 120.

FIG. 3 is a diagram showing an example of the manufacturing data 130 for analysis according to the first embodiment. In this example, the manufacturing data 130 for analysis is shown as data in a table format. Here, a vertical direction of the manufacturing data 130 for analysis is referred to as columns and a horizontal direction as rows. In this case, a column direction of the manufacturing data 130 for analysis indicates data items (types). On the other hand, a row direction of the manufacturing data 130 for analysis indicates individual products. That is, values of individual cells of the manufacturing data 130 for analysis indicate values of various data for each product.

Specifically, the first through third columns from the left of the manufacturing data 130 for analysis include product identification information (product number, processing/inspection time, and lot number). The fourth through eighth columns from the left of the manufacturing data 130 for analysis include manufacturing condition data (C1 to C5). The ninth and tenth columns from the left of the manufacturing data 130 for analysis include quality data (C6 and C7). Here, each of the plurality of values included in the manufacturing condition data or quality data is associated with each of the plurality of values included in the product identification information. For example, the manufacturing condition data C1 is specified as the target manufacturing condition data x, the manufacturing condition data C2 to C5 as the comparative manufacturing condition data group X', and the quality data C6 and C7 as the quality data group Y.

The manufacturing data 130 for analysis includes various data on D products. For example, the target manufacturing condition data x is a list (vector) of length D. The comparative manufacturing condition data group X' is a group including M lists (vectors) of length D. The quality data group Y is a group including N lists (vectors) of length D. In this example, D=17, M=4, and N=2.

For convenience of explanation, "d" (variable d=1 . . . D; d is an integer) will be hereinafter used as a subscript for the elements of a vector. According to this definition, "$x_d$" represents the dth value of the target manufacturing condition data x. For example, "$x_1$" represents the first value (A-1) of the target manufacturing condition data x.

(Step SUB1) Subsequently, the manufacturing data analysis device 200 performs manufacturing data analysis processing. After this processing, the manufacturing data analysis device 200 ends a series of processing.

FIG. 4 is a flowchart showing a first example of the manufacturing data analysis processing according to the first embodiment. This processing is a subroutine pertaining to step SUB1 in FIG. 2.

(Step S201) First, the manufacturing data analysis device 200 sets the variable i to 1 (i=1) by the analysis unit 212. Specifically, the analysis unit 212 sets the variable i to 1 for the quality data $y_i$ included in the quality data group Y.

(Step S202) Next, the manufacturing data analysis device 200 calculates, by the analysis unit 212, a degree of influence S ($y_i$, x) of the target manufacturing condition data x on the quality data $y_i$. Specifically, the analysis unit 212 calculates the degree of influence S ($y_i$, x) of the target manufacturing condition data x on each of the N pieces of quality data $y_i$. At the first execution of this step, the analysis unit 212 calculates the degree of influence S ($y_1$, x) of the target manufacturing condition data x on the quality data $y_1$. This step is repeated as many times as the number of pieces of quality data $y_i$ (i.e., N times).

(Step S203) Here, the manufacturing data analysis device 200 determines, by the determination unit 213, whether or not the degree of influence S ($y_i$, x) satisfies a predetermined determination condition. This determination condition may be a predetermined threshold value. That is, the determination unit 213 may determine that the degree of influence S ($y_i$, x) satisfies the predetermined determination condition if the degree of influence S ($y_i$, x) is equal to or greater than this threshold value. This threshold value may be set to any value by the user of the manufacturing data analysis device 200. If this determination condition is satisfied (YES in step S203), the process proceeds to step S204. On the other hand, if this determination condition is not satisfied (No in step S203), the process proceeds to step S205.

(Step S204) In this case, the manufacturing data analysis device 200 includes, by the output data generation unit 214, the contents (i.e., the analysis result) related to the target manufacturing condition data x, the quality data $y_i$, and the degree of influence S ($y_i$, x) in output data 250.

The analysis result is, for example, information indicating that the target manufacturing condition data x has influenced the quality data $y_i$. Specifically, the analysis result may be data names of the target manufacturing condition data x and the quality data $y_i$, or a value of the degree of influence S ($y_i$, x). Other analysis results may be data values of the target manufacturing condition data x and the quality data $y_i$, representative or statistical values based on these values, or charts such as histograms or scatter diagrams. The analysis results may also include additional information based on the degree of influence S ($y_i$, x). For example, the output data generation unit 214 may include information or a flag indicating a classification of "warning," "caution," or "no anomaly" in the analysis result, depending on a magnitude of the value of the degree of influence S ($y_i$, x).

Here, the degree of influence S ($y_i$, x) is assumed to take a value $0 \leq S(y_i, x) \leq 1$, and the closer the value is to 1, the greater the degree of influence. The output data generation unit 214 sets a first threshold value "0.9" and a second threshold value "0.7" for the degree of influence S ($y_i$, x). At this time, the output data generation unit 214 may change information to be included in the analysis result according to each of the cases where the degree of influence S ($y_i$, x) is (i) equal to or greater than the first threshold value, (ii) below the first threshold value and equal to or greater than the second threshold value, and (iii) below the second threshold value. Specifically, the output data generation unit 214 may include information or a flag indicating a classification "warning" in case (i), "caution" in case (ii), and "no anomaly" in case (iii) in the analysis result. In particular, in case (iii), the output data generation unit 214 may not include these evaluation results of the degree of influence S ($y_i$, x) in the analysis result.

(Step S205) Subsequently, the manufacturing data analysis device 200 increments the variable i by 1 (i=i+1) by the analysis unit 212.

(Step S206) Here, the manufacturing data analysis device 200 determines whether or not the variable i is greater than N (i>N?) by the analysis unit 212. If this determination condition is satisfied (YES in step S206), the process proceeds to step S207. On the other hand, if this determination condition is not satisfied (NO in step S206), the process returns to step S202.

(Step S207) In this case, the manufacturing data analysis device 200 generates, by the output data generation unit 214, output data 250 including various analysis results. The output data generation unit 214 also outputs the output data 250 to the display device 300. After this step, the manufacturing data analysis device 200 ends a series of processing.

In the following, a calculation process of the degree of influence S ($y_i$, x) in step S202 will be described. The degree of influence S ($y_i$, x) indicates a degree of influence that the quality data $y_i$ receives from the target manufacturing condition data x. In other words, the degree of influence S ($y_i$, x) indicates a degree of influence exerted by the target manufacturing condition data x on the quality data $y_i$. The degree of influence S ($y_i$, x) may be a correlation coefficient (e.g., Pearson's product-moment correlation coefficient, Spearman's rank correlation coefficient, Kendall's rank correlation coefficient, or a maximal information coefficient (MIC)). In particular, if the target manufacturing condition data x and the quality data $y_i$ both include category values, the degree of influence S ($y_i$, x) may be a linkage coefficient (e.g., Goodman-Kruskal's tau, Kramer's V). If Goodman-Kruskal's tau is used for the degree of influence S ($y_i$, x), the smaller of the two values calculated from the two data items should be used.

Here, it is assumed that the target manufacturing condition data x includes a category value. In this case, the analysis unit 212 calculates the number of products for each type of values included in the target manufacturing condition data x. Next, the analysis unit 212 calculates the number of products determined to have an anomaly (number of anomalies) for the quality data $y_i$ out of the calculated number of products. The analysis unit 212 then calculates the anomaly rate $v_i$ of the products for each type of values included in the target manufacturing condition data x according to the aforementioned formula for calculating the anomaly rate $v_i$. The analysis unit 212 then calculates the degree of influence S ($y_i$, x) exerted by the target manufacturing condition data x on the quality data $y_i$ based on numerical value data including these calculated values.

FIG. 5 is a diagram showing examples of the numerical value data according to the first embodiment. FIG. 5(A) is first numerical value data 410 according to an example in which anomalies occur in equal proportions for each type of values included in the target manufacturing condition data x. FIG. 5(B) is second numerical value data 420 according to an example in which anomalies occur at an unbalanced rate for particular types of values included in the target manufacturing condition data x.

In this example, the target manufacturing condition data x is data indicating a name of a material used for products in a specific process. In this process, each product is processed by one of the materials "material A", "material B", and "material C". That is, the target manufacturing condition data x includes material A, material B, and material C as its value types. The quality data $y_i$ is, for example, the size of the product.

According to the material A in the first numerical value data 410, the number of products for which this material is used is "1000", and of this number of products, the number of products whose quality data $y_i$ is determined to be anomalous is "20". An anomaly rate $v_i$ of the products for which the material A is used is calculated by the formula 20/1000=0.020. The various values are the same for the other materials B and C.

On the other hand, according to the material A in the second numerical value data 420, the number of products for which this material is used is "1000", and of this number of products, the number of products whose quality data $y_i$ is determined to be anomalous is "3". An anomaly rate $v_i$ of the products for which the material A is used is calculated by the formula 3/1000=0.003. According to the material B, the number of products for which this material is used is "1000", and of this number of products, the number of products whose quality data $y_i$ is determined to be anomalous is "50". An anomaly rate $v_i$ of the products for which the material B is used is calculated by the formula 50/1000=0.050. That is, in the second numerical value data 420, the material B can be a cause of the product anomaly.

Here, the analysis unit 212 calculates a bias rate of anomaly for each material using the formula (anomaly rate $v_i$ of products with that material)/(sum of anomaly rates $v_i$ of products with each material). In this example, a bias rate is calculated for each of the material A, material B, and material C. The analysis unit 212 calculates a bias rate whose value is the largest (maximum bias rate) among the calculated multiple bias rates as a degree of influence S ($y_i$, x).

According to the first numerical value data 410, (maximum bias rate)=0.020/(0.020+0.020+0.020)≈0.33. On the other hand, according to the second numerical value data 420, (maximum bias rate)=0.050/(0.003+0.050+0.007) ≈0.83. Therefore, based on the first numerical value data 410, the degree of influence S ($y_i$, x) exerted by the target manufacturing condition data x on the quality data $y_i$ is "0.33". On the other hand, based on the second numerical value data 420, the degree of influence S ($y_i$, x) exerted by the target manufacturing condition data x on the quality data $y_i$ is "0.83". The calculated degree of influence S ($y_i$, x) may be converted to a percentage (%).

In the above example, the analysis unit 212 quantifies the degree of influence S ($y_i$, x) based on a magnitude of the value (anomaly rate $v_i$) calculated from the quality data $y_i$ being biased toward a particular value type of the target manufacturing condition data x as an index. Alternatively, the analysis unit 212 may quantify the degree of influence S ($y_i$, x) based on a magnitude of a value of the quality data $y_i$ being biased toward a particular value type included in the target manufacturing condition data x as an index.

In the above example, if quality data $y_i$ is determined to be anomalous for a very small number of products out of the total number of products to be analyzed and quality data $y_i$ is determined to be not anomalous for the remaining products, the maximum bias rate will tend to increase. Therefore, the analysis unit 212 may perform calculation by correcting the maximum bias rate to be smaller according to a product anomaly rate $v_i$ with respect to the total number of products to be analyzed. The greater the number of types of values included in the target manufacturing condition data x (three types in the aforementioned example), the more the maximum bias rate tends to increase. Therefore, the analysis unit 212 may perform calculation by correcting the maximum bias rate so that the greater the number of types of values, the smaller the maximum bias rate. The analysis unit 212 may use the corrected maximum bias rate as the degree of influence S ($y_i$, x).

In the present embodiment, the analysis unit 212 may formulate a bias when products determined to have anomalies are biased toward a specific material in a framework of a statistical test, and estimate a causality of the target manufacturing condition data x with respect to the quality data $y_i$. In the following, the analysis unit 212 uses a G-test framework as a type of statistical test method in a case where the target manufacturing condition data x includes a variable (category value) related to a nominal scale of "material name". The analysis unit 212 may use other likelihood ratio test (e.g., a chi-square test) frameworks.

First, the analysis unit 212 counts up, for each material, the number of products for which that material is used and the number of products for which that material is used and whose quality data $y_i$ is determined to be anomalous (number of anomalies). Next, the analysis unit 212 expresses the number of material types as K, the number of products for which that material is used as $N_i$ {i=1, 2, . . . , and K}, and the number of anomalies as $O_i$ {i=1, 2, . . . , and K}. In addition, the analysis unit 212 expresses the total number of products $N_{all}$ by the following formula (1), and the number of all products whose quality data $y_i$ is determined to be anomalous (total number of anomalies) $N_o$ by the following formula (2).

$$N_{all} = \sum_{i=1}^{K} N_i \tag{1}$$

$$N_o = \sum_{i=1}^{K} O_i \tag{2}$$

Here, the analysis unit 212 regards the manufacturing data to be analyzed as a population and formulates a null hypothesis that "a material-specific distribution of anomalous products is identical to a distribution randomly extracted from the population". Next, the analysis unit 212 tests this null hypothesis and calculates a p-value. The smaller the p-value, the higher the probability that the null hypothesis will be rejected. Rejection of the null hypothesis means that "the material-specific distribution of anomalous products is not identical to a distribution randomly extracted from the population", suggesting that anomalous products are more likely to occur in a particular material. Therefore, if the p-value is sufficiently small, the analysis unit 212 regards it highly probable that the target manufacturing condition data x is associated with a cause of anomalies in the quality data $y_i$. Therefore, the analysis unit 212 calculates a G-value indicated by the following formula (3) through a G test.

$$G = 2\sum_{i=1}^{K} O_i \cdot \log_e(O_i/E_i) \tag{3}$$

In formula (3), $E_i$ is the number of products expected by the null hypothesis and is calculated by the following formula (4).

$$E_i = N_o \cdot P(i) = N_o \cdot \frac{N_i}{N_{all}} \tag{4}$$

In formula (4), P(i) is an expected probability, i.e., a probability that an anomalous product will occur in item i (i-th material) if the null hypothesis holds. If a true value of P(i) is unknown, the analysis unit 212 approximates P(i) by a frequency distribution $N_i/N_{all}$ of the number of products to be analyzed. Next, the analysis unit 212 calculates a p-value corresponding to the G-value by the following formula (5), using a chi-square distribution f(x, k).

$$p = \int_G^{\infty} f(x, k)dx \tag{5}$$

In formula (5), k=K−1, where k represents a degree of freedom of the chi-square distribution. In the chi-square distribution, the larger the degree of freedom k is, the harder it is for the p-value to become small. If the number of products determined to have anomalies is small in relation to the number of types K of the target manufacturing condition data x, a bias will occur even if it is a random sampling, but the above property allows a significance of the bias to be evaluated in consideration of the number of types K. The analysis unit 212 takes the p-value as the degree of influence S ($y_i$, x). Therefore, the smaller the degree of influence S ($y_i$, x) is, the higher the causality of the target manufacturing condition data x with respect to the quality data $y_i$.

The above is a description of the case where the target manufacturing condition data x includes a category value, such as a variable related to a nominal scale. On the other hand, if the target manufacturing condition data x includes continuous values, the analysis unit 212 may quantify a bias as an index value using a correlation coefficient of a probability that a product has an anomaly (anomaly rate) and the target manufacturing condition data x. For example, if a product with an anomaly rate close to 1.0 is biased toward a high or low value of the target manufacturing condition data x, an absolute value of the correlation coefficient increases. Thus, the analysis unit 212 may use the absolute value of the correlation coefficient as the degree of influence S ($y_i$, x).

If a distribution of data is not linear, the analysis unit 212 may use Spearman's correlation coefficient instead of Pearson's correlation coefficient. In particular, the analysis unit 212 may use a p-value from a test of correlation coefficient (e.g., test of no correlation) as the degree of influence S ($y_i$, x).

In the present embodiment, the analysis unit 212 may use a regression error obtained by regression analysis on the target manufacturing condition data x and the quality data $y_i$ as the degree of influence S ($y_i$, x). If a regression model with a small regression error (e.g., least squares error) or a regression model with a high likelihood is obtained from the target manufacturing condition data x and the quality data $y_i$, the determination unit 213 may determine that the target manufacturing condition data x has influenced the quality data $y_i$.

Regression analysis methods used include, for example, linear regression, generalized linear regression (e.g., logistic regression, Poisson regression), basis linear regression, kernel regression, support vector regression, multilayer perceptron, regression trees, and random forests. If the target manufacturing condition data x and the quality data $y_i$ include category values, the analysis unit 212 may apply One-Hot encoding to the category values and then perform a regression analysis.

The analysis unit 212 may also estimate a causal factor related to a change factor of the quality data $y_i$ using an index different from the regression error. In general, regression errors tend to be smaller for models in which data elements with a large number of levels or combinations of a large number of data elements are used as explanatory variables. To avoid relying on this tendency, the analysis unit 212 may estimate this causal factor using a model comparison index value that takes into account a complexity of the model (e.g., the number of explanatory variables, regularization strength in nonlinear regression) in addition to the goodness of fit of the model.

The model comparison index values include, for example, the Akaike's information criterion (AIC), the Bayesian information criterion (BIC), the widely applicable information criterion (WAIC), and Mallows' Cp. A cross-validation (e.g., one-out cross-validation, K-split cross-validation) error may also be used as another index value.

The aforementioned index values indicate that the smaller the value, the higher the likelihood of the model. On the other hand, the analysis unit 212 may use a marginal likelihood in a regression model or an approximate value of a marginal likelihood to estimate the likelihood of the model. In the marginal likelihood, a larger value indicates a higher likelihood of the model. A model comparison index value, such as BIC, can also be regarded as an approximate value of a likelihood of a model (logarithmic marginal likelihood). Therefore, the analysis unit 212 may use a likelihood of a model (e.g., AIC, BIC, marginal likelihood, logarithmic marginal likelihood) as a score for estimating a change factor of the quality data $y_i$.

In the present embodiment, the analysis unit 212 may calculate the degree of influence S ($y_i$, x) using a model trained by machine learning. As a matter of course, the analysis unit 212 may use other bias calculation methods, testing methods, or methods for calculating the degree of influence S ($y_i$, x).

In the present embodiment, the degree of influence S ($y_i$, x) is a continuous value, and it is assumed that the larger the value of S ($y_i$, x), the greater the degree of influence exerted by the target manufacturing condition data x on the quality data $y_i$. Conversely, if it is assumed that the smaller the value the degree of influence S ($y_i$, x) is, the greater the degree of influence is, the determination unit 213 should reverse the positive and negative signs of the degree of influence S ($y_i$, x) in the condition determination. As a matter of course, the degree of influence S ($y_i$, x) may be a discrete value.

Figure 6:
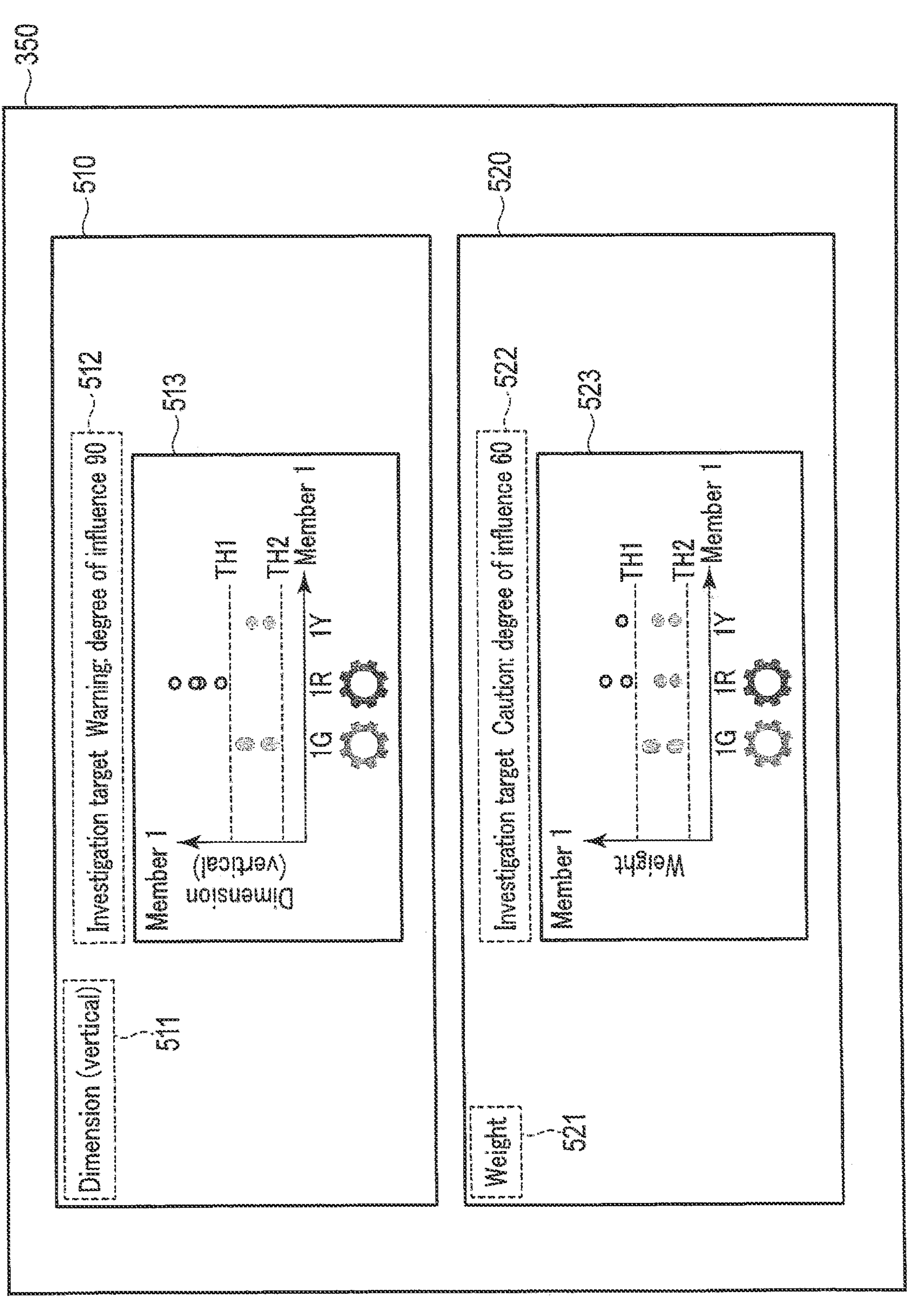
FIG. 6 is a diagram showing a first display example of an image based on output data according to the first embodiment.

FIG. 6 is a diagram showing a first display example of an image based on the output data 250 according to the first embodiment. Here, a first display image 510 including an analysis result of one piece of quality data $y_i$ and a second display image 520 including an analysis result of another piece of quality data $y_i$ are displayed inside a whole display area 350 of the display device 300. Preferably, the first display image 510 and the second display image 520 are arranged in parallel in the whole display area 350 so that the user can easily compare the analysis results in both images.

In this example, a threshold value of the degree of influence S ($y_i$, x) is set to "50", for example. In this case, the first display image 510 and the second display image 520 are displayed as analysis results of target manufacturing condition data x and quality data $y_i$ with a degree of influence S ($y_i$, x) of "50" or more.

The first display image 510 includes an area 511 at an upper left edge and areas 512 and 513 near the center. In the area 511, a data name (dimension (vertical)) of predetermined quality data $y_i$ to be analyzed (investigated) is displayed. The area 512 displays the degree of influence S ($y_i$, x) (degree of influence 90) exerted by the target manufacturing condition data x (member 1) to be analyzed on the predetermined quality data $y_i$. In the area 512, a "warning" is displayed as an evaluation result for the degree of influence S ($y_i$, x). At this time, character modification may be applied to the font, color, size, etc. of characters representing the "degree of influence 90" and "warning" so that they are highlighted. For example, these characters are changed to a predetermined color (e.g., red) that is reminiscent of the "warning".

Similarly, a type, color, thickness, etc. of a frame border of the first display image 510 may be changed so that the frame border is highlighted. Since the first display image 510 includes the "warning" in the area 512, the color of the frame border of the first display image 510 may be changed to a predetermined color (e.g., red) that is reminiscent of the "warning".

In the area 513, a data name (member 1) of the target manufacturing condition data x is displayed at an upper left edge, and as an analysis result of the target manufacturing condition data x and the quality data $y_i$, a scatter diagram based on both pieces of data is displayed near the center. In this scatter diagram, an abscissa axis indicates respective values of the target manufacturing condition data x (member 1G, member 1R, and member 1Y), and an ordinate axis indicates respective values of the quality data $y_i$. A first threshold value TH1 and a second threshold value TH2, which is smaller than the first threshold value TH1, for the value of the quality data $y_i$ are respectively indicated by dashed lines. In particular, among the plurality of values related to the quality data $y_i$, data points indicating values equal to or greater than the first threshold value TH1 are highlighted by being surrounded by a frame line of a predetermined color (e.g., red). With this display mode, the user can easily recognize anomalous values of the quality data $y_i$.

According to the scatter diagram in the area 513, the quality data $y_i$ shows anomalous values, biased toward a specific value (member 1R) among the plurality of values included in the target manufacturing condition data x. Thus, the degree of influence S ($y_i$, x) is "90", which is relatively large.

On the other hand, the second display image 520 is similar to the first display image 510 in terms of arrangement of each area. Specifically, the second display image 520 includes an area 521 at an upper left edge and areas 522 and 523 near the center. In the area 521, a data name (weight) of predetermined quality data $y_i$ to be analyzed (investigated) is displayed. In the area 522, the degree of influence (degree of influence 60) exerted by the target manufacturing condition data x (member 1) to be analyzed (investigated) on the predetermined quality data $y_i$ is displayed. In the area 522, "caution" is displayed as an evaluation result for the degree of influence S ($y_i$, x). At this time, the aforementioned character modification may be applied to the characters representing "degree of influence 60" and "caution" so that the characters are highlighted. For example, these characters may be changed to a predetermined color (e.g., yellow) that is reminiscent of "caution".

Similarly, a type, color, thickness, etc. of a frame border of the second display image 520 may be changed so that the color of the frame border is highlighted. Since the second display image 520 includes "caution" in the area 522, the color of the frame border of the second display image 520 may be changed to a predetermined color (e.g., yellow) that is reminiscent of "caution".

In the area 523, a data name (member 1) of the target manufacturing condition data is displayed at an upper left edge, and as an analysis result of the target manufacturing condition data x and the quality data $y_i$, a scatter diagram based on both pieces of data is displayed near the center. A display mode of the scatter diagram in the area 523 is the same as that of the scatter diagram in the area 513.

According to the scatter diagram in the area 523, some values of the quality data $y_i$ show anomalous values for specific values (member 1R and member 1Y) among the plurality of values included in the target manufacturing condition data x. That is, there is no anomalous value biased toward one specific value, and a bias of distribution of anomalous values is relatively small, so the degree of influence S ($y_i$, x) is "60", which is moderate.

Figure 7:
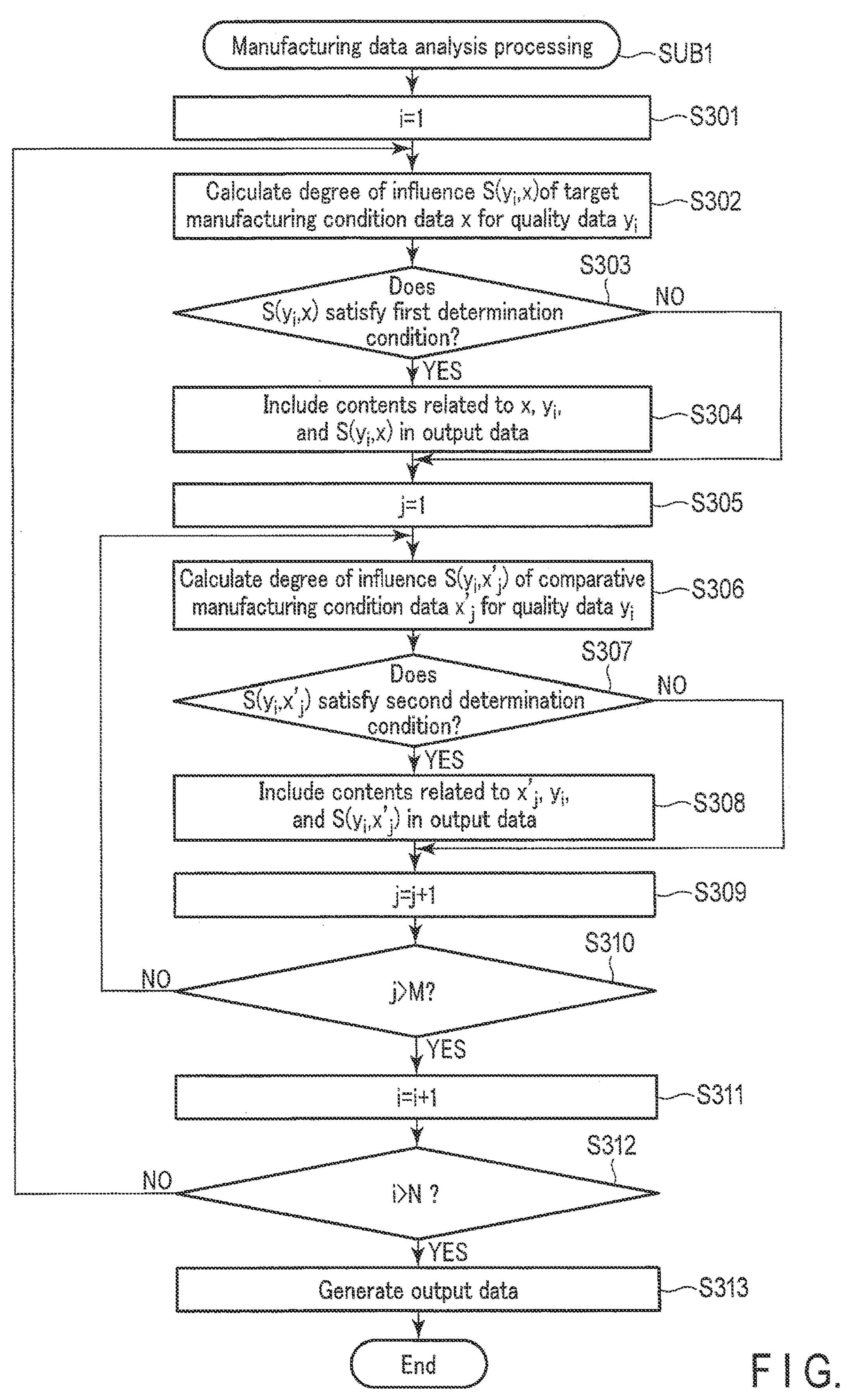
FIG. 7 is a flowchart showing a second example of the manufacturing data analysis processing according to the first embodiment.

FIG. 7 is a flowchart showing a second example of the manufacturing data analysis processing according to the first embodiment. In addition to the analysis processing in FIG. 4, the analysis processing in FIG. 7 performs analysis on respective comparative manufacturing condition data $x'_j$ included in the comparative manufacturing condition data group X'.

(Step S301) First, the manufacturing data analysis device 200 sets the variable i to 1 (i=1) by the analysis unit 212. Step S301 is similar to step S201.

(Step S302) Next, the manufacturing data analysis device 200 calculates, by the analysis unit 212, a degree of influence S ($y_i$, x) of the target manufacturing condition data x on the quality data $y_i$. Step S302 is similar to step S202.

(Step S303) Here, the manufacturing data analysis device 200 determines, by the determination unit 213, whether or not the degree of influence S ($y_i$, x) satisfies a predetermined determination condition (first determination condition). This determination condition may be a predetermined threshold value (first threshold value). Step S303 is similar to step S203. If this determination condition is satisfied (YES in step S303), the process proceeds to step S304. On the other hand, if this determination condition is not satisfied (NO in step S303), the process proceeds to step S305.

(Step S304) In this case, the manufacturing data analysis device 200 includes, by the output data generation unit 214, the contents (i.e., the analysis result) related to the target manufacturing condition data x, the quality data $y_i$, and the degree of influence S ($y_i$, x) in output data 250. Step S304 is similar to step S204.

(Step S305) Subsequently, the manufacturing data analysis device 200 sets the variable j to 1 (j=1) by the analysis unit 212. Specifically, the analysis unit 212 sets the variable j to 1 for the comparative manufacturing condition data $$x'_j$$

included in the comparative manufacturing condition data group X'.

(Step S306) Subsequently, the manufacturing data analysis device 200 calculates, by the analysis unit 212, a degree of influence S $$(y_i, x'_j)$$

of the comparative manufacturing condition data $$x'_j$$

on the quality data $y_i$. Specifically, the analysis unit 212 calculates the degree of influence S $$(y_i, x'_j)$$

of each of M pieces of comparative manufacturing condition data $$x'_j$$

on each of N pieces of quality data $y_i$. At the first execution of this step, the analysis unit 212 calculates a degree of influence S $$(y_1, x'_1)$$

of comparative manufacturing condition data $$x'_1$$

on quality data $y_1$. This step is repeated M times for a single piece of quality data $y_i$. That is, this step is repeated N×M times.

The degree of influence S $$(y_i, x'_j)$$

indicates a degree of influence that the quality data yi receives from the comparative manufacturing condition data $$x'_j.$$

In other words, the degree of influence S $$(y_i, x'_j)$$

indicates a degree of influence exerted by the comparative manufacturing condition data $$x'_j$$

on the quality data $y_i$. It suffices that the degree of influence S $$(y_i, x'_j)$$

is calculated by the same method as the degree of influence S ($y_i$, x). As a matter of course, the degree of influence S $$(y_i, x'_j)$$

and the degree of influence S ($y_i$, x) may be calculated by the same method or by different methods.

(Step S307) Here, the manufacturing data analysis device 200 determines, by the determination unit 213, whether or not the degree of influence S $$(y_i, x'_j)$$

satisfies a predetermined determination condition (second determination condition). This determination condition may be a predetermined threshold value (second threshold value). That is, the determination unit 213 may determine that the degree of influence S $$(y_i, x'_j)$$

satisfies the predetermined determination condition if the degree of influence S $$(y_i, x'_j)$$

is equal to or greater than the predetermined threshold value. This threshold value can be set to any value by the user of the manufacturing data analysis device 200. If this determination condition is satisfied (YES in step S307), the process proceeds to step S308. On the other hand, if this determination condition is not satisfied (No in step S307), the process proceeds to step S309.

The predetermined threshold value (second threshold value) related to the condition determination in step S307 may be equal to or greater than the predetermined threshold value (first threshold value) related to the condition determination in step S303. Setting of such a threshold value means that the output data generation unit 214 includes an analysis result of the comparative manufacturing condition data $$x'_j$$

in the output data 250 if the degree of influence S $$(y_i, x'_j)$$

of the comparative manufacturing condition data $$x'_j$$

on certain quality data $y_i$ is equal to or greater than the degree of influence S ($y_i$, x) of the target manufacturing condition data x on the same quality data $y_i$.

Alternatively, the output data generation unit 214 may set the second threshold value based on the degree of influence S ($y_i$, x). The output data generation unit 214 may set the second threshold value to a constant multiple of the degree of influence S ($y_i$, x), or the like.

(Step S308) In this case, the manufacturing data analysis device 200 includes, by the output data generation unit 214, the contents (i.e., the analysis result) related to the comparative manufacturing condition data $$x'_j,$$

the quality data $y_i$, and the degree of influence S $$(y_i, x'_j)$$

in the output data 250.

The output data generation unit 214 may set at least one condition for the value of the degree of influence S $$(y_i, x'_j),$$

and change the content to be included in the analysis result according to a determination result of each condition. For example, the output data generation unit 214 sets the first threshold value "degree of influence S ($y_i$, x)" as a first condition and the second threshold value "degree of influence S ($y_i$, x)×0.7" as a second condition. At this time, the output data generation unit 214 may change information to be included in the analysis result according to each of the cases where the degree of influence S $$(y_i, x'_j)$$

is (i) equal to or greater than the first threshold value, (ii) below the first threshold value and equal to or greater than the second threshold value, and (iii) below the second threshold value. Specifically, the output data generation unit 214 may include information or a flag indicating the classification "warning" in case (i), "caution" in case (ii), or "no anomaly" in case (iii) in the analysis result. In particular, in case (iii), the output data generation unit 214 may not include these evaluation results of the degree of influence S $$(y_i, x'_j)$$

in the analysis result.

(Step S309) Subsequently, the manufacturing data analysis device 200 increments the variable j by 1 (j=j+1) by the analysis unit 212.

(Step S310) Here, the manufacturing data analysis device 200 determines whether or not the variable j is greater than M (j>M?) by the analysis unit 212. If this determination condition is satisfied (YES in step S310), the process proceeds to step S311. On the other hand, if this determination condition is not satisfied (NO in step S310), the process returns to step S306.

(Step S311) Subsequently, the manufacturing data analysis device 200 increments the variable i by 1 (i=i+1) by the analysis unit 212.

(Step S312) Here, the manufacturing data analysis device 200 determines whether or not the variable i is greater than N (i>N?) by the determination unit 213. Step S312 is similar to step S206. If this determination condition is satisfied (YES in step S312), the process proceeds to step S313. On the other hand, if this determination condition is not satisfied (NO in step S312), the process returns to step S302.

(Step S313) In this case, the manufacturing data analysis device 200 generates output data 250 including various analysis results by the output data generation unit 214. Step S313 is similar to step S207. However, this output data 250 can include the analysis result for the comparative manufacturing condition data $$x'_j.$$

After this step, the manufacturing data analysis device 200 ends a series of processing.

In the above operation example, the analysis unit 212 calculates the degree of influence S $$(y_i, x'_j)$$

for each of the pieces of comparative manufacturing condition data $$x'_j$$

included in the comparative manufacturing condition data group X'. Here, if a plurality of degrees of influence S $$(y_i, x'_j)$$

satisfy a predetermined determination condition, the output data generation unit 214 may include in the output data 250 a plurality of analysis results of the comparative manufacturing condition data $$x'_j$$

and the quality data $y_i$ that satisfy that predetermined determination condition. At this time, some or all of that plurality of analysis results may be included in the output data 250. For example, an analysis result of the comparative manufacturing condition data $$x'_j$$

and the quality data $y_i$ with the highest degree of influence $$(y_i, x'_j)$$

may be selected, or analysis results may be selected in descending order of the degree of influence S $$(y_i, x'_j).$$

Further, the output data generation unit 214 may sort the plurality of analysis results of the comparative manufacturing condition data $$x'_j$$

and the quality data $y_i$ by a predetermined criterion and include them in the output data 250. For example, the output data generation unit 214 may sort these plurality of analysis results in order of magnitude of the degree of influence S $$(y_i, x'_j),$$

or in dictionary order of data names pertaining to the comparative manufacturing condition $$x'_j.$$

The output data generation unit 214 may also sort these plurality of analysis results in a predetermined order related to the comparative manufacturing condition data $$x'_j.$$

For example, the output data generation unit 214 may sort these plurality of analysis results by the order of manufacturing data columns in the manufacturing data, or by the order of product processes.

In the above operation example, the analysis unit 212 calculates the degree of influence S ($y_i$, x), the degree of influence S $$(y_i, x'_j),$$

and the analysis results for each of the pieces of quality data $y_i$ included in the quality data group Y. The output data generation unit 214 includes in the output data 250 analysis results that satisfy a predetermined determination condition among a plurality of analysis results of the target manufacturing condition data x and the comparative manufacturing condition data group X' for each of the pieces of quality data $y_i$. If a plurality of analysis results related to the quality data $y_i$ are included in the output data 250, the output data generation unit 214 may sort these plurality of analysis results by a predetermined criterion and include them in the output data 250. At this time, the output data generation unit 214 may use the above-described sorting methods for these plurality of analysis results.

Alternatively, the output data generation unit 214 may sort the analysis results in ascending order of the degree of influence S ($y_i$, x) or degree of influence S $$(y_i, x'_j).$$

For example, if, for the quality data $y_i$, a plurality of analysis results of the target manufacturing condition data x and the comparative manufacturing condition data group X' are included, the output data generation unit 214 may sort these analysis results by the maximum value of the degree of influence S ($y_i$, x) or degree of influence S $$(y_i, x'_j).$$

The output data generation unit 214 may also calculate an index value for the quality data $y_i$ by a known method and sort the analysis results according to this index value. For example, the output data generation unit 214 may use an anomaly degree of the quality data $y_i$ as the index value. The anomaly degree is, for example, a magnitude of a mean, variance, or standard deviation of the quality data $y_i$. Alternatively, the anomaly degree may be a ratio of the number of pieces of data determined to indicate an anomaly value to the number of pieces of data of the quality data $y_i$. This anomaly value may be a value that is greater or less than a predetermined threshold value among a plurality of values of the quality data $y_i$.

Figure 8:
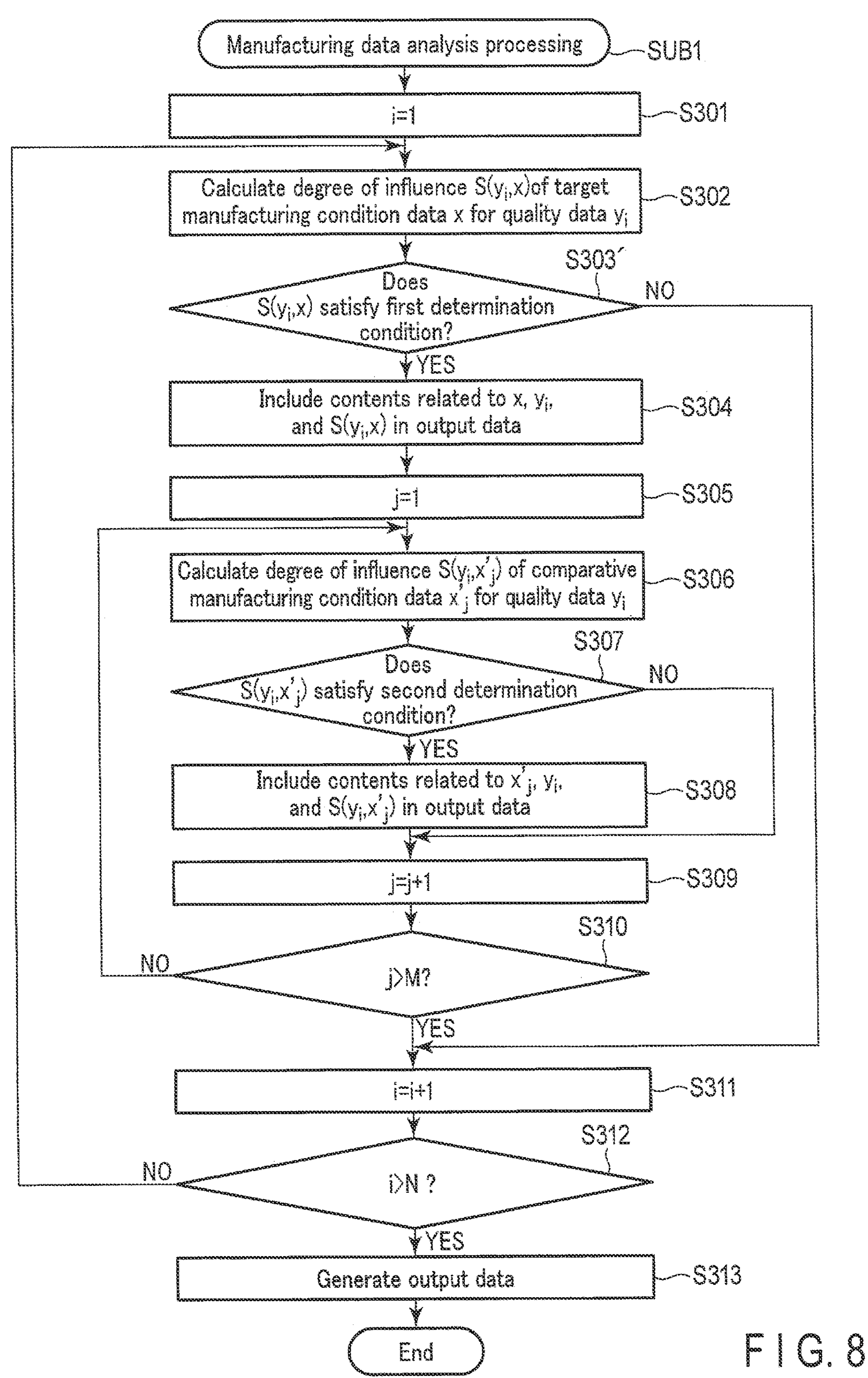
FIG. 8 is a flowchart showing a third example of the manufacturing data analysis processing according to the first embodiment.

FIG. 8 is a flowchart showing a third example of the manufacturing data analysis processing according to the first embodiment. In addition to the analysis processing in FIG. 4, the analysis processing in FIG. 8 performs analysis on the respective comparative manufacturing condition data $$x'_j$$

included in the comparative manufacturing condition data group X' in a given case. The analysis processing in FIG. 8 is the same as the analysis processing in FIG. 7, except for a process in step S303'.

(Step S303') Here, the manufacturing data analysis device 200 determines whether or not the degree of influence S ($y_i$, x) satisfies the predetermined determination condition (first determination condition) by the determination unit 213. The determination in step S303' is the same as the determination in step S303. If this determination condition is satisfied (YES in step S303'), the process proceeds to step S304. On the other hand, if this determination condition is not satisfied (NO in step S303'), the process proceeds to step S311.

That is, the manufacturing data analysis device 200 does not perform analysis on the comparative manufacturing condition data group X' if the target manufacturing condition data x does not exert a certain level of degree of influence S ($y_i$, x) or more on the quality data $y_i$. This allows the manufacturing data analysis device 200 to reduce a processing time required for analysis.

Figure 9:
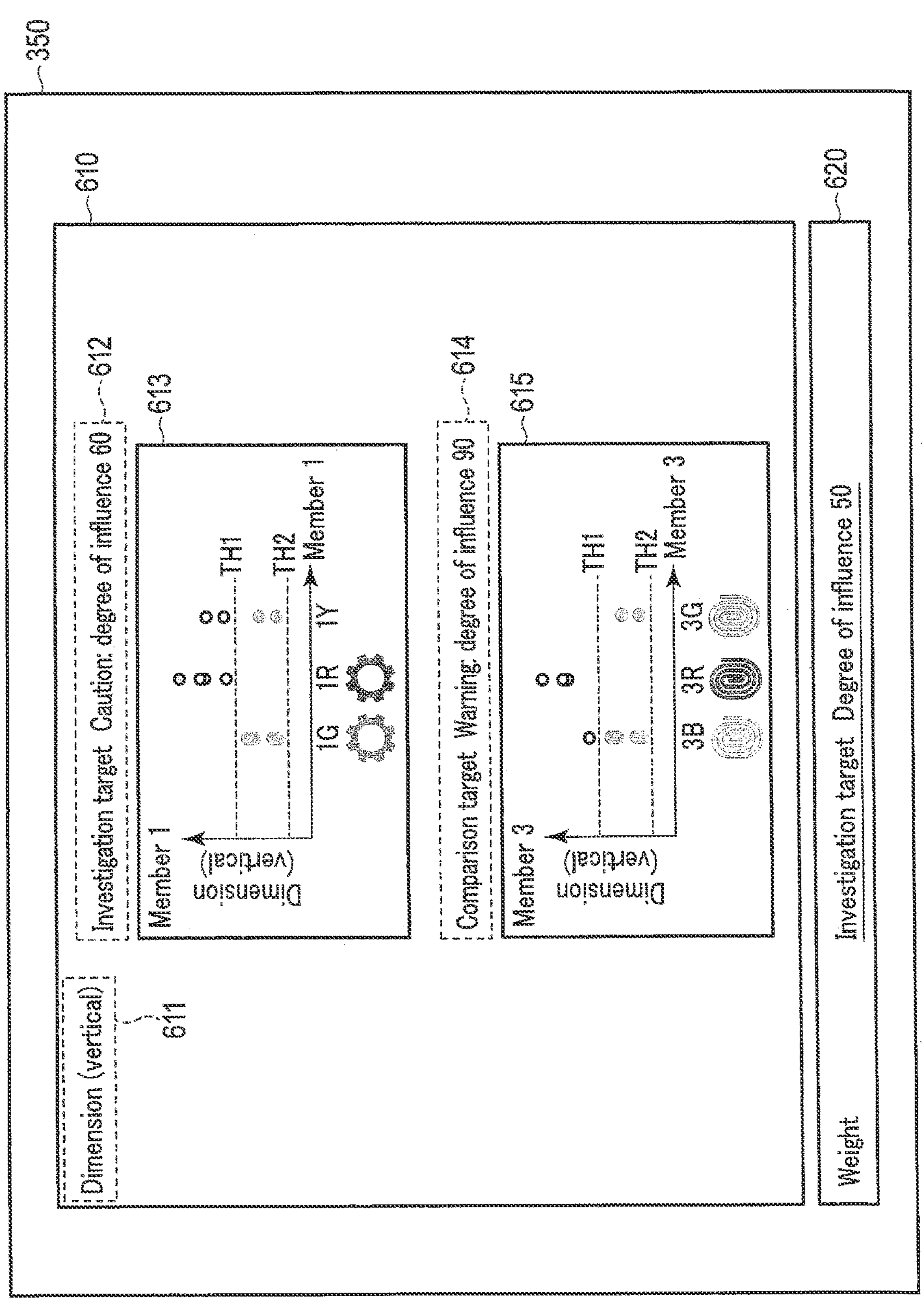
FIG. 9 is a diagram showing a second display example of an image based on output data according to the first embodiment.

FIG. 9 is a diagram showing a second display example of an image based on the output data 250 according to the first embodiment. As in FIG. 6, a first display image 610 including an analysis result of one piece of quality data $y_i$ and a second display image 620 including an analysis result of another piece of quality data $y_i$ are displayed inside the whole display area 350 of the display device 300. Preferably, the first display image 610 and the second display image 620 are arranged in parallel in the whole display area 350 so that the user can easily compare the analysis results in both images.

The first display image 610 includes an area 611 at an upper left edge and areas 612, 613, 614, and 615 near the center. Of these, display modes, etc. of the areas 611 to 613 are the same as those of the areas 511 to 513.

In the area 614, a degree of influence S $$(y_i, x'_j)$$

(degree of influence 90) exerted by comparative manufacturing condition data $$x'_j$$

(member 3) to be compared on the predetermined quality data $y_i$ is displayed. In addition, "warning" is displayed in the area 614 as an evaluation result for the degree of influence S $$(y_i, x'_j).$$

A display mode, etc. of the area 614 is the same as that of the area 512.

In the area 615, a data name (member 3) of the comparative manufacturing condition data $$x'_j$$

is displayed at an upper left edge, and as an analysis result of the comparative manufacturing condition data $$x'_j$$

and the quality data $y_i$, a scatter diagram based on both pieces of data is displayed near the center. In this scatter diagram, an abscissa axis indicates respective values (member 3B, member 3R, and member 3G) of the comparative manufacturing condition data $$x'_j,$$

and an ordinate axis indicates respective values of the quality data $y_i$. A display mode, etc. of the area 615 is the same as that of the area 513.

On the other hand, the second display image 620 displays a data name (weight) of the quality data $y_i$ at the left end and a degree of influence S ($y_i$, x) (degree of influence 50) of the target manufacturing condition data x (member 1) near the center. Here, the user may select the second display image 620 to display detailed analysis results included in the second display image 620.

The manufacturing data analysis system 1 according to the first embodiment has been described above. According to the first embodiment, the manufacturing data analysis device 200 can detect quality data $y_i$ with a relatively large degree of influence S ($y_i$, x) exerted by target manufacturing condition data x specified by the user or the like among all the quality data $y_i$ specified by the user or the like. At this time, the manufacturing data analysis device 200 can reduce the number of pieces of display data by not outputting an analysis result for quality data with a relatively small degree of influence exerted by the predetermined manufacturing condition. This allows the manufacturing data analysis device 200 to reduce man-hours required for the user to investigate an influence of a predetermined manufacturing condition on all the quality data and man-hours required to interpret results of this investigation.

In addition, the manufacturing data analysis device 200 can detect, in addition to the target manufacturing condition data x, comparative manufacturing condition data $$x'_j$$

with a relatively large degree of influence S $$(y_i, x'_j)$$

exerted on the same quality data $y_i$. The manufacturing data analysis device 200 then outputs an analysis result of this comparative manufacturing condition data $$x'_j$$

together with the analysis result of the target manufacturing condition data x with respect to the same quality data $y_i$. In this way, the manufacturing data analysis device 200 can assist the user in distinguishing an influence, on the same quality data, of a predetermined manufacturing condition from an influence of other manufacturing conditions than the predetermined manufacturing condition.

The manufacturing data analysis device 200 according to the first embodiment changes the display mode of the output data 250 according to the degree of influence S ($y_i$, x). Specifically, the manufacturing data analysis device 200 changes the display mode of each analysis result included in the output data 250 according to the degree of influence S ($y_i$, x) of the target manufacturing condition data x for each piece of quality data $y_i$. For example, the manufacturing data analysis device 200 highlights an analysis result of quality data $y_i$ with a relatively large degree of influence S ($y_i$, x). Thus, the manufacturing data analysis device 200 can reduce man-hours required for monitoring by the user. Also, the manufacturing data analysis device 200 can present the degrees of influence of the target manufacturing condition data x and the comparative manufacturing condition data $$x'_j$$

in a manner that is intuitively easy for the user to understand. As described above, the manufacturing data analysis device 200 can assist the user in monitoring the manufacturing data.

Second Embodiment

Figure 10:
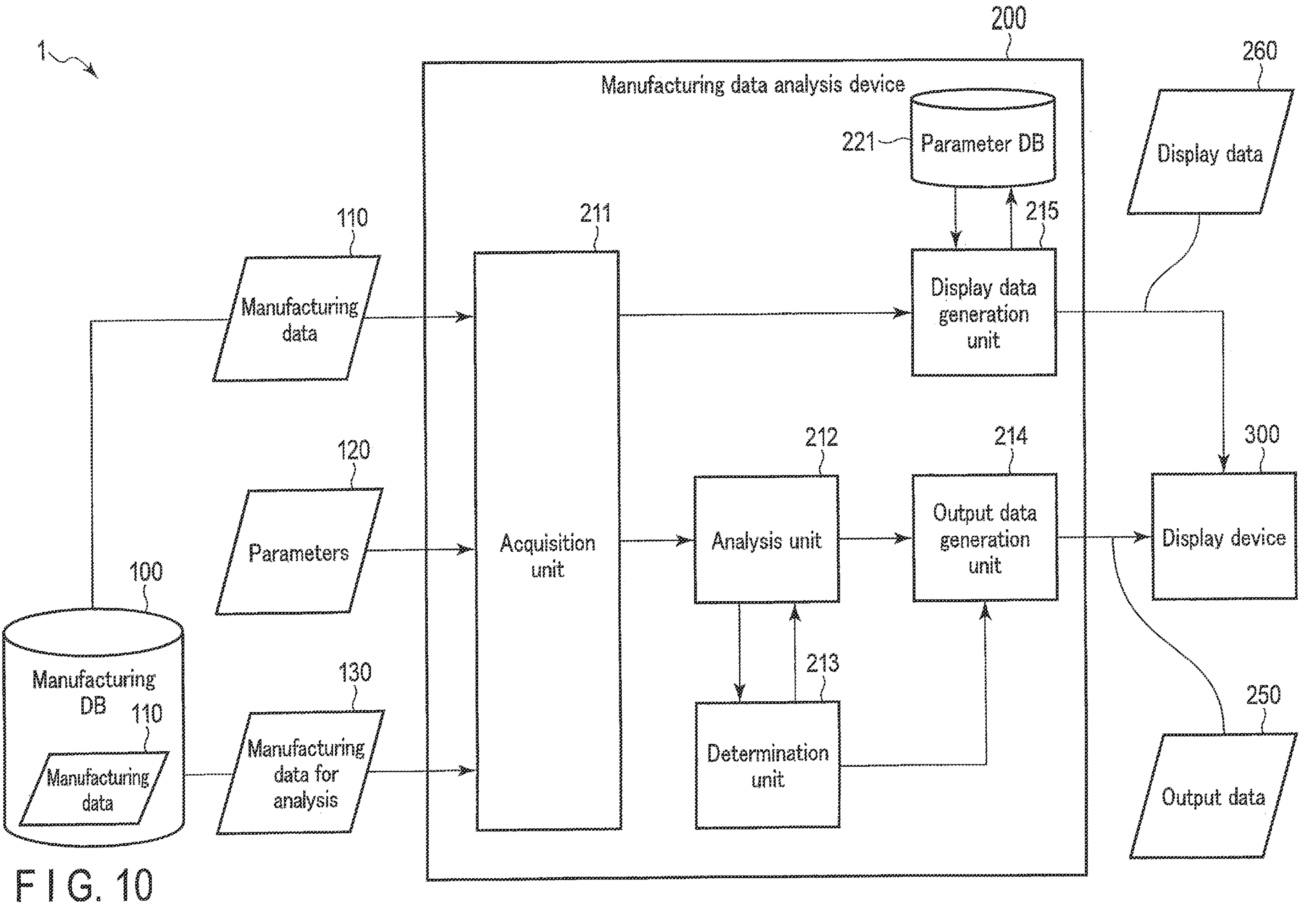
FIG. 10 is a block diagram showing a functional configuration example of a manufacturing data analysis system according to a second embodiment.

FIG. 10 is a block diagram showing a functional configuration example of a manufacturing data analysis system 1 according to a second embodiment. In addition to the configuration according to the first embodiment, the manufacturing data analysis system 1 according to the second embodiment includes a display data generation unit 215 and a parameter DB 221.

The display data generation unit 215 generates display data 260 related to a setting screen for the user to set the parameters 120. As described above, the parameters 120 include the first data acquisition condition AC1, the target manufacturing condition data x, the comparative manufacturing condition data group X', and the quality data group Y. For example, the display data generation unit 215 generates a list of the parameters 120 based on the manufacturing data 110 acquired from the manufacturing DB 100, and generates the display data 260 for displaying this list on the setting screen.

The parameter DB 221 is a database that stores the list of the parameters 120 generated by the display data generation unit 215. That list can be read by the display data generation unit 215. That list can also be updated by the display data generation unit 215 with a predetermined content. A discretionary list of the parameters 120 may be stored in advance in the parameter DB 221.

Figure 11:
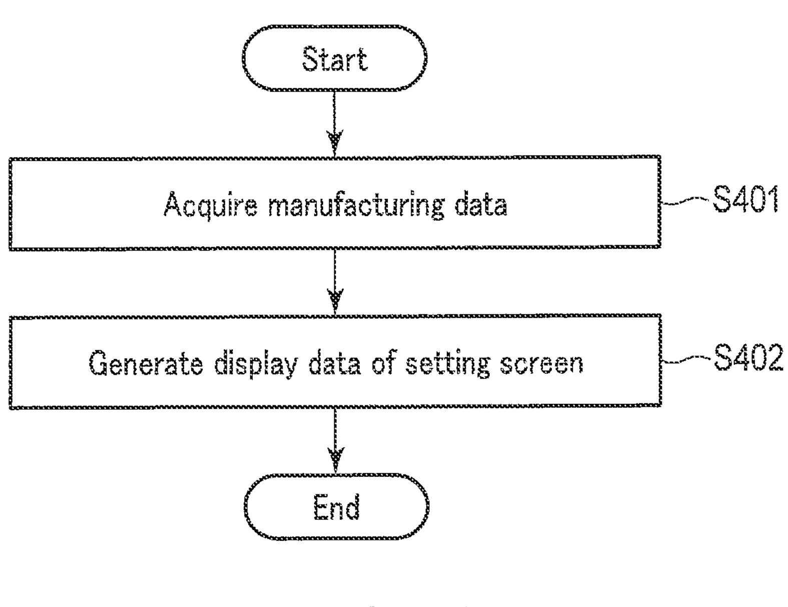
FIG. 11 is a flowchart showing an operation example of a manufacturing data analysis device according to the second embodiment.

FIG. 11 is a flowchart showing an operation example of the manufacturing data analysis device 200 according to the second embodiment. This operation example can be initiated by an instruction from a user of the manufacturing data analysis device 200 or an external system.

(Step S401) First, the manufacturing data analysis device 200 acquires the manufacturing data 110 from the manufacturing DB 100 by the acquisition unit 211. The acquisition unit 211 outputs the acquired manufacturing data 110 to the display data generation unit 215.

(Step S402) Next, the manufacturing data analysis device 200 generates the display data 260 of the setting screen related to the parameters 120 by the display data generation unit 215. Specifically, the display data generation unit 215 may extract a data name for each type of the parameters 120 included in the manufacturing data 110. The display data generation unit 215 may then generate a list including the extracted data names and generate the display data 260 including this list. The display data generation unit 215 outputs the display data 260 to the display device 300. After this step, the manufacturing data analysis device 200 ends a series of processing.

Firstly, if the parameter 120 is the first data acquisition condition AC1, the display data generation unit 215 generates a list concerning candidates for the first data acquisition condition AC1. For example, the display data generation unit 215 extracts data names related to various information or data (identification information, manufacturing condition data, and quality data) included in the manufacturing data 110 and generates a list. For example, the display data generation unit 215 generates a list including data names related to a time, a time period, and a lot number related to product inspection and processing. Alternatively, the display data generation unit 215 may generate a list of candidates for the first data acquisition condition AC1 according to the target manufacturing condition data x set by the user or the like. Specifically, the display data generation unit 215 may generate a list of values that the target manufacturing condition data x can take.

Secondly, if the parameter 120 is the target manufacturing condition data x, the display data generation unit 215 generates a list concerning candidates for the target manufacturing condition data x. For example, the display data generation unit 215 extracts data names related to manufacturing condition data included in the manufacturing data 110 and generates a list.

Third, if the parameter 120 is the comparative manufacturing condition data group X', the display data generation unit 215 generates a list concerning candidates for the comparative manufacturing condition data group X'. Preferably, the display data generation unit 215 generates a list by excluding candidates for the target manufacturing condition data x from the candidates for the comparative manufacturing condition data group X'. If a candidate for a comparative manufacturing condition data group X' corresponding to each piece of target manufacturing condition data x is stored in the parameter DB 221, the display data generation unit 215 may read from the parameter DB 221 a candidate for a comparative manufacturing condition data group X' corresponding to set target manufacturing condition data x.

For example, the display data generation unit 215 makes one or more pieces of manufacturing condition data pertaining to the same process as the target manufacturing condition data x or to a process prior to the target manufacturing condition data x a candidate for the comparative manufacturing condition data group X'. Alternatively, the display data generation unit 215 may use a comparative manufacturing condition data group X' that has been set as the one for the target manufacturing condition data x in the past as a candidate for the comparative manufacturing condition data group X'. The display data generation unit 215 may also use one or more pieces of manufacturing condition data with a degree of influence calculated to be greater than the degree of influence of the target manufacturing condition data x in the past as a candidate for the comparative manufacturing condition data group X'.

Fourth, if the parameter 120 is the quality data group Y, the display data generation unit 215 generates a list concerning candidates for the quality data group Y. Preferably, the display data generation unit 215 generates a list by excluding the data names included in the target manufacturing condition data x and the comparative manufacturing condition data group X' from the candidates for the quality data group Y. If a candidate for a quality data group Y corresponding to each piece of target manufacturing condition data x or each comparative manufacturing condition data group X' is stored in the parameter DB 221, the display data generation unit 215 may read, from the parameter DB 221, a candidate for a quality data group Y corresponding to set target manufacturing condition data x or comparative manufacturing condition data group X'.

Figure 12:
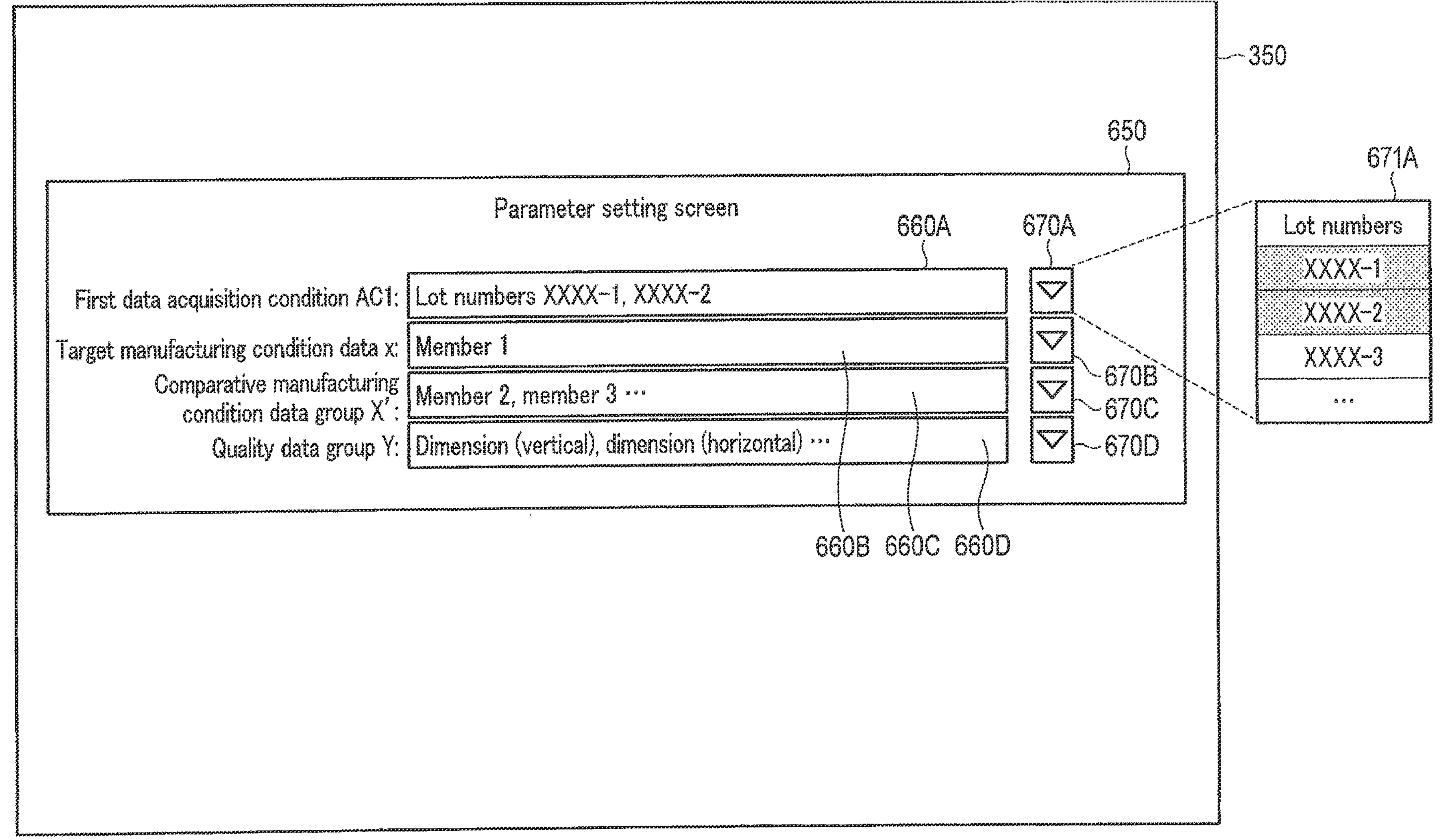
FIG. 12 is a diagram showing a display example of a setting screen based on display data according to the second embodiment.

FIG. 12 is a diagram showing a display example of a setting screen 650 based on the display data 260 according to the second embodiment. Here, the setting screen 650 of the parameters 120 is displayed inside the whole display area 350 of the display device 300.

The setting screen 650 includes boxes 660A, 660B, 660C, and 660D in which the parameters 120 selected by the user or the like are displayed. The setting screen 650 also includes buttons 670A, 670B, 670C, and 670D each for displaying a list of each parameter 120 by pop-up or the like. For example, the user selects any desired one of the buttons 670A to 670D via an input IF (interface) connected to the manufacturing data analysis device 200. The manufacturing data analysis device 200 displays a list corresponding to the selected one of the buttons 670A to 670D on the display device 300. The "list" is rephrased as a "pull-down menu".

For example, if the button 670A corresponding to the first data acquisition condition AC1 is selected, a list 671A concerning "lot numbers" to be candidates for the first data acquisition condition AC1 is displayed. The list 671A is superimposed or displayed in parallel with the setting screen 650. The list 671A includes a plurality of values (XXXX-1, XXXX-2, XXXX-3, . . . ) related to the lot number. Here, the values "XXXX-1" and "XXXX-2" are selected out of those values, and the names of the selected values are displayed in the box 660A.

A "decision button" may be displayed on the setting screen 650 to decide a setting content of each parameter 120. Upon selection of the decision button by the user, the manufacturing data analysis device 200 may acquire manufacturing data 130 for analysis based on each parameter 120 and execute the manufacturing data analysis processing, as shown in FIG. 2.

The display data generation unit 215 may compare the parameters 120 specified by the user or the like with the data (parameter data) stored in the manufacturing data 110 or the parameter DB 221, and if the specified parameters 120 do not exist in the manufacturing data 110 or the parameter DB 221, generate display data for a display screen of an error. As a matter of course, the display data generation unit 215 may output this display data to the display device 300. In this way, the manufacturing data analysis device 200 can present to the user or the like that the parameters 120 specified by the user or the like cannot be set. It suffices that this error is output in a manner that can be easily recognized by the user, etc., and may be an alarm sound, for example.

Furthermore, the display data generation unit 215 may generate display data pertaining to a proposed change of the parameters 120 if the parameters 120 specified by the user or the like do not exist in the manufacturing data 110 or the parameter DB 221. Alternatively, the display data generation unit 215 may automatically change the parameters 120 specified by the user or the like. Specifically, if a predetermined parameter 120, among the plurality of parameters 120 specified by the user or the like, does not exist in the manufacturing data 110 or the parameter DB 221, the display data generation unit 215 may present the remaining parameters 120 excluding that predetermined parameter 120. At this time, the display data generation unit 215 may present that excluded predetermined parameter 120.

In addition, the display data generation unit 215 may set the parameters 120 based on an analysis result of an external device or an external system different from the manufacturing data analysis device 200. For example, if predetermined manufacturing condition data is estimated as a cause of an anomaly of predetermined quality data $y_i$ by that external device or external system, the display data generation unit 215 may set that predetermined manufacturing condition data as the target manufacturing condition data x. As a matter of course, the manufacturing data analysis device 200 may perform various analyses on this target manufacturing condition data x.

The manufacturing data analysis system 1 according to the second embodiment has been described above. According to the second embodiment, the manufacturing data analysis device 200 generates the display data 260 related to the setting screen 650 of the parameters 120 based on the manufacturing data 110 stored in the manufacturing DB 100. This allows the user to select desired parameters 120 on the setting screen 650. That is, the manufacturing data analysis device 200 can assist the user in selecting the parameters 120.

Third Embodiment

Figure 13:
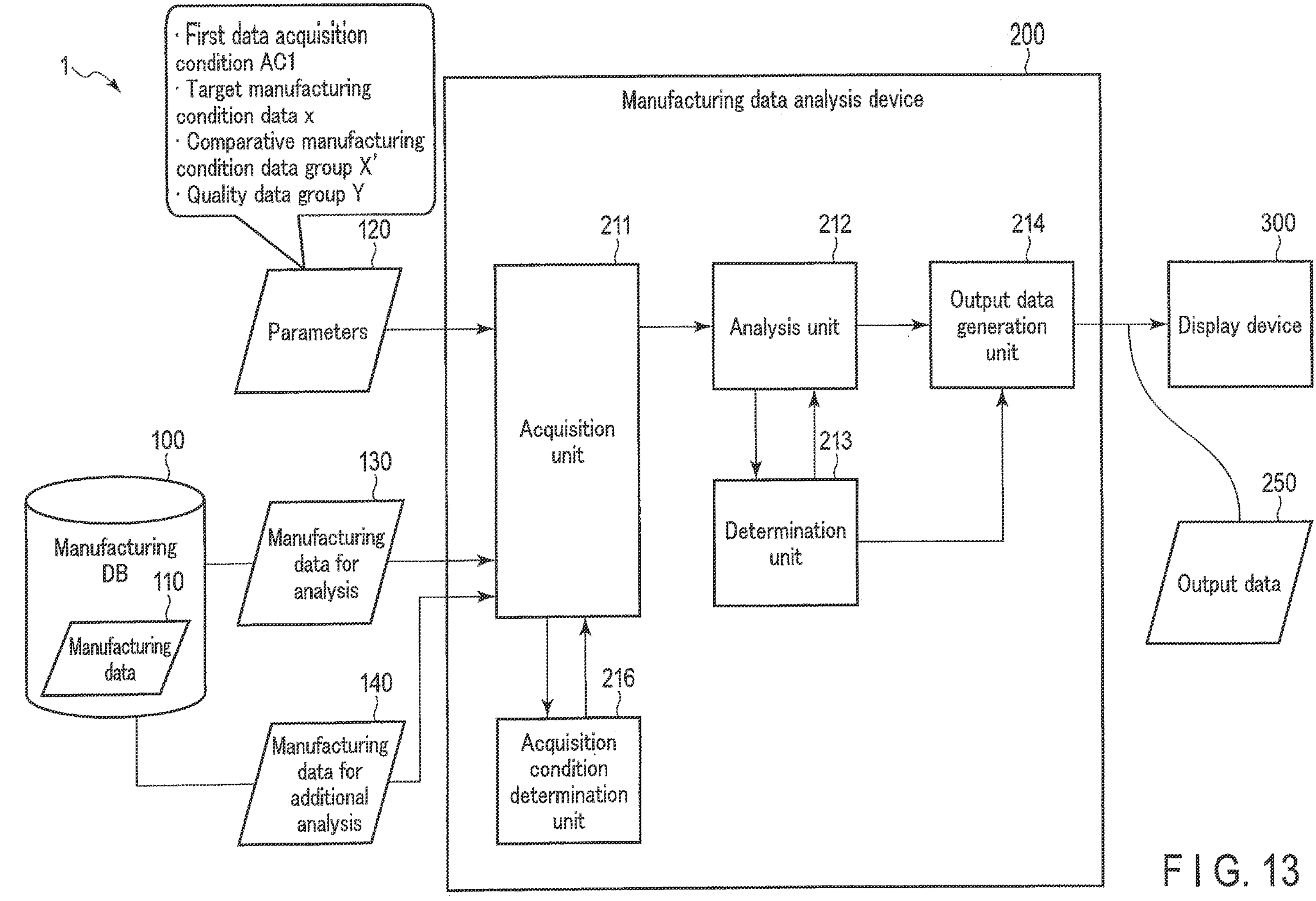
FIG. 13 is a block diagram showing a functional configuration example of a manufacturing data analysis system according to a third embodiment.

FIG. 13 is a block diagram showing a functional configuration example of a manufacturing data analysis system 1 according to a third embodiment. In addition to the configuration according to the first embodiment, the manufacturing data analysis system 1 according to the third embodiment includes an acquisition condition determination unit 216.

The acquisition unit 211 acquires the manufacturing data 130 for analysis including the target manufacturing condition data x, the comparative manufacturing condition data group X', and the quality data group Y from the manufacturing data 110 included in the manufacturing DB 100 under the first data acquisition condition AC1 based on the externally input parameters 120. At this time, for identification of a group of products included in an analysis range, the acquisition unit 211 may include information for identifying each individual or group of individuals of products in the manufacturing data 130 for analysis. The acquisition unit 211 outputs the manufacturing data 130 for analysis to the acquisition condition determination unit 216 and the analysis unit 212.

The acquisition condition determination unit 216 determines an acquisition condition (second data acquisition condition AC2) of the manufacturing data 110 so as to reduce bias in a plurality of values included in the target manufacturing condition data x, comparative manufacturing condition data $$x'_j,$$

or quality data $y_i$ in the manufacturing data 130 for analysis input from the acquisition unit 211. Here, the second data acquisition condition AC2 is different from the first data acquisition condition AC1. For example, the second data acquisition condition AC2 is a range including part or all of the first data acquisition condition AC1. The second data acquisition condition AC2 may also be a condition to acquire a greater number of pieces of data than the first data acquisition condition AC1 from the manufacturing data 110.

The acquisition condition determination unit 216 outputs the second data acquisition condition AC2 to the acquisition unit 211.

The acquisition unit 211 acquires manufacturing data 140 for additional analysis including target manufacturing condition data x, comparative manufacturing condition data group X', and quality data group Y from the manufacturing data 110 included in the manufacturing DB 100 under the second data acquisition condition AC2 input from the acquisition condition determination unit 216. At this time, for identification of product groups included in an analysis range, the acquisition unit 211 may include information for identifying each individual or group of individuals of products in the manufacturing data 140 for additional analysis. The acquisition unit 211 outputs the manufacturing data 140 for additional analysis to the analysis unit 212.

The analysis unit 212 analyzes at least one of the manufacturing data 130 for analysis or the manufacturing data 140 for additional analysis input from the acquisition unit 211, and calculates index values S ($y_i$, x) and S $$(y_i, x'_j)$$

indicative of a strength of a relationship between the target manufacturing condition data x and the quality data $y_i$ and a strength of a relationship between the comparative manufacturing condition data $$x'_j$$

and the quality data $y_i$. The index values S ($y_i$, x) and S $$(y_i, x'_j)$$

are each a value that indicates, for example, a possibility (causality) that the target manufacturing condition data x or the comparative manufacturing condition data $$x'_j$$

is a cause of variations in the quality data $y_i$. The analysis unit 212 outputs the index values S ($y_i$, x) and S $$(y_i, x'_j)$$

as analysis results to the determination unit 213 and the output data generation unit 214. In the present embodiment, the index value S ($y_i$, x) is the same as the above-described degree of influence S ($y_i$, x).

The output data generation unit 214 generates output data 250 based on the analysis results input from the analysis unit 212. For example, the output data generation unit 214 generates output data 250 including at least one of the analysis result of the manufacturing data 130 for analysis or the analysis result of the manufacturing data 140 for additional analysis. The output data generation unit 214 may include data names of the target manufacturing condition data x, the comparative manufacturing condition data $$x'_j,$$

and the quality data $y_i$, as well as the index values S ($y_i$, x) and S $$(y_i, x'_j)$$

in the output data 250, as analysis results. The output data generation unit 214 may also include values, representative values, statistical values, histograms, scatter diagrams, etc. of the target manufacturing condition data x, the comparative manufacturing condition data $$x'_j,$$

and the quality data $y_i$ in the output data 250. The output data generation unit 214 outputs the output data 250 to the display device 300.

FIG. 14 is a flowchart showing an operation example of the manufacturing data analysis device 200 according to the third embodiment. Similar to the operation example in FIG. 2, the present operation example can be initiated when the user of the manufacturing data analysis device 200 or an external system inputs the parameters 120 into the manufacturing data analysis device 200.

(Step S501) First, the manufacturing data analysis device 200 acquires, by the acquisition unit 211, a first data acquisition condition AC1, target manufacturing condition data x, a comparative manufacturing condition data group X', and a quality data group Y as the parameters 120. Step S501 is similar to step S101.

(Step S502) Next, the manufacturing data analysis device 200 acquires, by the acquisition unit 211, manufacturing data 130 for analysis from the manufacturing data 110 included in the manufacturing DB 100 based on the parameters 120. Step S502 is similar to step S102.

(Step S503) Subsequently, the manufacturing data analysis device 200 sets the variable i to 1 (i=1) by the analysis unit 212. Specifically, the analysis unit 212 sets the variable i to 1 for quality data $y_i$ included in the quality data group Y.

(Step S504) Subsequently, the manufacturing data analysis device 200 sets the variable j to 1 (j=1) by the analysis unit 212. Specifically, the analysis unit 212 sets the variable j to 1 for comparative manufacturing condition data $$x'_j$$

included in the comparative manufacturing condition data group X'.

(Step SUB2) Subsequently, the manufacturing data analysis device 200 performs analysis processing of manufacturing data for analysis by the analysis unit 212.

(Step S505) Subsequently, the manufacturing data analysis device 200 determines, by the acquisition condition determination unit 216, a second data acquisition condition AC2 based on manufacturing condition data $x_j$ included in the manufacturing data 130 for analysis. The "manufacturing condition data $$x''_j$$

refers to the comparative manufacturing condition data $$x'_j$$

included in the comparative manufacturing condition data group X' and the target manufacturing condition data x. That is, the acquisition condition determination unit 216 may determine the second data acquisition condition AC2 based on the comparative manufacturing condition data $$x'_j$$

and the target manufacturing condition data x included in the manufacturing data 130 for analysis.

(Step S506) Subsequently, the manufacturing data analysis device 200 acquires, by the acquisition unit 211, manufacturing data 140 for additional analysis based on the second data acquisition condition AC2.

(Step SUB3) Subsequently, the manufacturing data analysis device 200 performs analysis processing of manufacturing data for additional analysis by the analysis unit 212.

(Step S507) Subsequently, the manufacturing data analysis device 200 selects any one or both of a first analysis result and a second analysis result by the output data generation unit 214, and includes the selected analysis result in output data 250. For example, the output data generation unit 214 may compare index values S (y, x) and S $$(y, x'_j)$$

included in the first analysis result and index values S (y, x) and S $$(y, x'_j)$$

included in the second analysis result, and select the analysis result including the larger index values S (y, x) and S $$(y, x'_j).$$

If both analysis results are included in the output data 250, the output data generation unit 214 may sort the first analysis result and the second analysis result in order of the larger or smaller index values S (y, x) and S $$(y, x'_j).$$

The first analysis result is an analysis result for the manufacturing data 130 for analysis, and the second analysis result is an analysis result for the manufacturing data 140 for additional analysis.

(Step S508) Subsequently, the manufacturing data analysis device 200 increments the variable j by 1 (j=j+1) by the analysis unit 212.

(Step S509) Here, the manufacturing data analysis device 200 determines whether or not the variable j is greater than M (j>M?) by the analysis unit 212. If this determination condition is satisfied (YES in step S509), the process proceeds to step S510. On the other hand, if this determination condition is not satisfied (NO in step S509), the process returns to step SUB2.

(Step S510) In this case, the manufacturing data analysis device 200 increments the variable i by 1 (i=i+1) by the analysis unit 212.

(Step S511) Here, the manufacturing data analysis device 200 determines whether or not the variable i is greater than N (i>N?) by the analysis unit 212. If this determination condition is satisfied (YES in step S511), the process proceeds to step S512. On the other hand, if this determination condition is not satisfied (NO in step S511), the process returns to step S504.

(Step S512) In this case, the manufacturing data analysis device 200 generates output data 250 including the analysis result by the output data generation unit 214. After this process, the manufacturing data analysis device 200 ends a series of processing.

Figure 15:
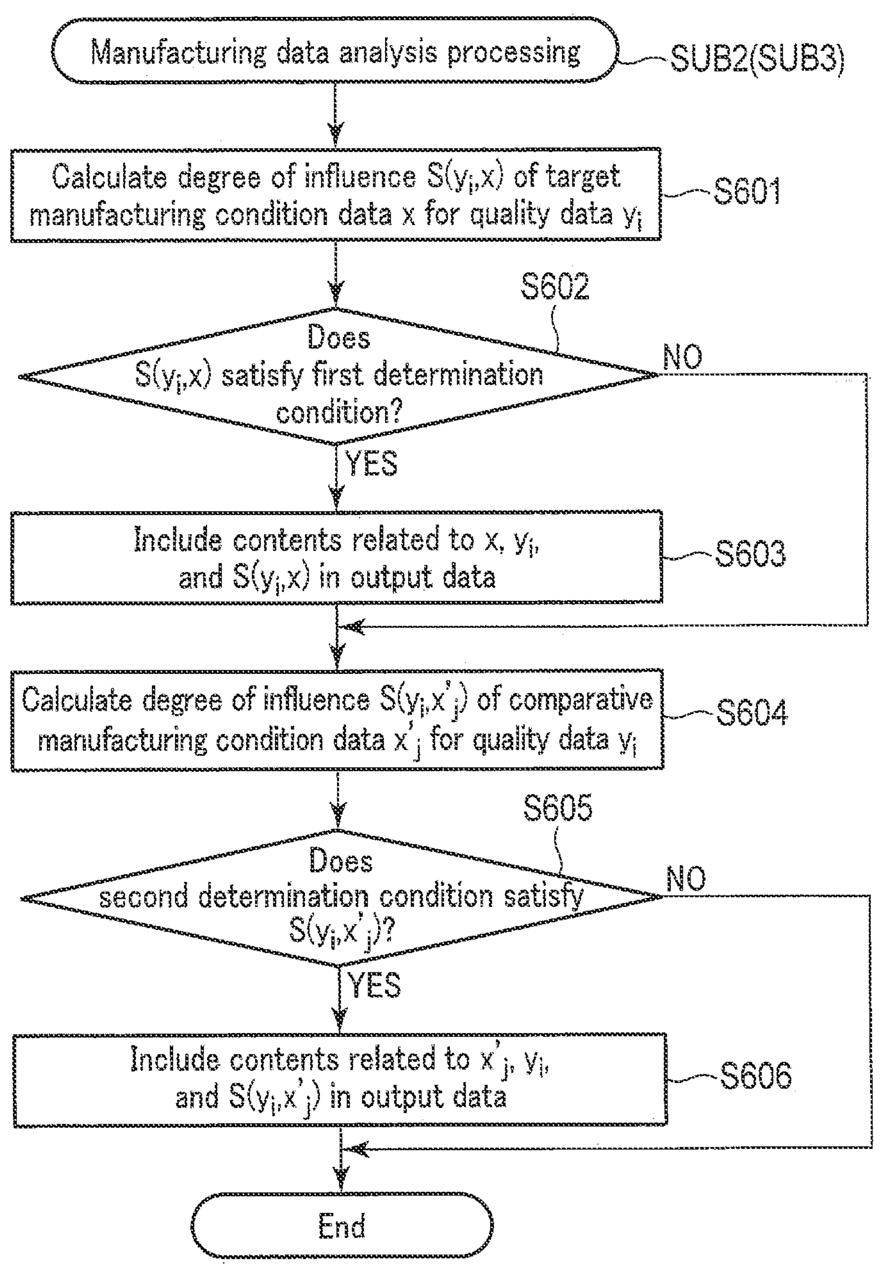
FIG. 15 is a flowchart showing an example of manufacturing data analysis processing according to the third embodiment.

FIG. 15 is a flowchart showing an example of the manufacturing data analysis processing according to the third embodiment. This processing is a subroutine pertaining to steps SUB2 and SUB3 in FIG. 14. That is, the same processing is performed for the manufacturing data 130 for analysis and the manufacturing data 140 for additional analysis.

(Step S601) First, the manufacturing data analysis device 200 calculates, by the analysis unit 212, the degree of influence S ($y_i$, x) of the target manufacturing condition data x on the quality data $y_i$.

(Step S602) Here, the manufacturing data analysis device 200 determines whether or not the degree of influence S ($y_i$, x) satisfies a predetermined determination condition (first determination condition) by the determination unit 213. This determination condition may be a predetermined threshold value (first threshold value). That is, the determination unit 213 may determine that the degree of influence S ($y_i$, x) satisfies the predetermined determination condition if the degree of influence S ($y_i$, x) is equal to or greater than the predetermined threshold value. If this determination condition is satisfied (YES in step S602), the process proceeds to step S603. On the other hand, if this determination condition is not satisfied (NO in step S602), the process proceeds to step S604.

(Step S603) In this case, the manufacturing data analysis device 200 includes, by the output data generation unit 214, the contents (i.e., the analysis result) related to the target manufacturing condition data x, the quality data $y_i$, and the degree of influence S ($y_i$, x) in the output data 250.

(Step S604) Subsequently, the manufacturing data analysis device 200 calculates, by the analysis unit 212, the degree of influence S $$(y_i, x'_j)$$

of the comparative manufacturing condition data $$x'_j$$

on the quality data $y_i$.

(Step S605) Here, the manufacturing data analysis device 200 determines whether or not the degree of influence S $$(y_i, x'_j)$$

satisfies a predetermined determination condition (second determination condition) by the determination unit 213. This determination condition may be a predetermined threshold value (second threshold value). That is, the determination unit 213 may determine that the degree of influence S $$(y_i, x'_j)$$

satisfies the predetermined determination condition if the degree of influence S $$(y_i, x'_j)$$

is equal to or greater than the predetermined threshold value. If this determination condition is satisfied (YES in step S605), the process proceeds to step S606. On the other hand, if this determination condition is not satisfied (NO in step S605), the manufacturing data analysis device 200 ends the manufacturing data analysis processing.

(Step S606) In this case, the manufacturing data analysis device 200 includes, by the output data generation unit 214, the contents (i.e., the analysis result) related to the comparative manufacturing condition data $$x'_j,$$

the quality data $y_i$, and the degree of influence S $$(y_i, x'_j)$$

in the output data 250. After this step, the manufacturing data analysis device 200 ends a series of processing.

Figure 16:
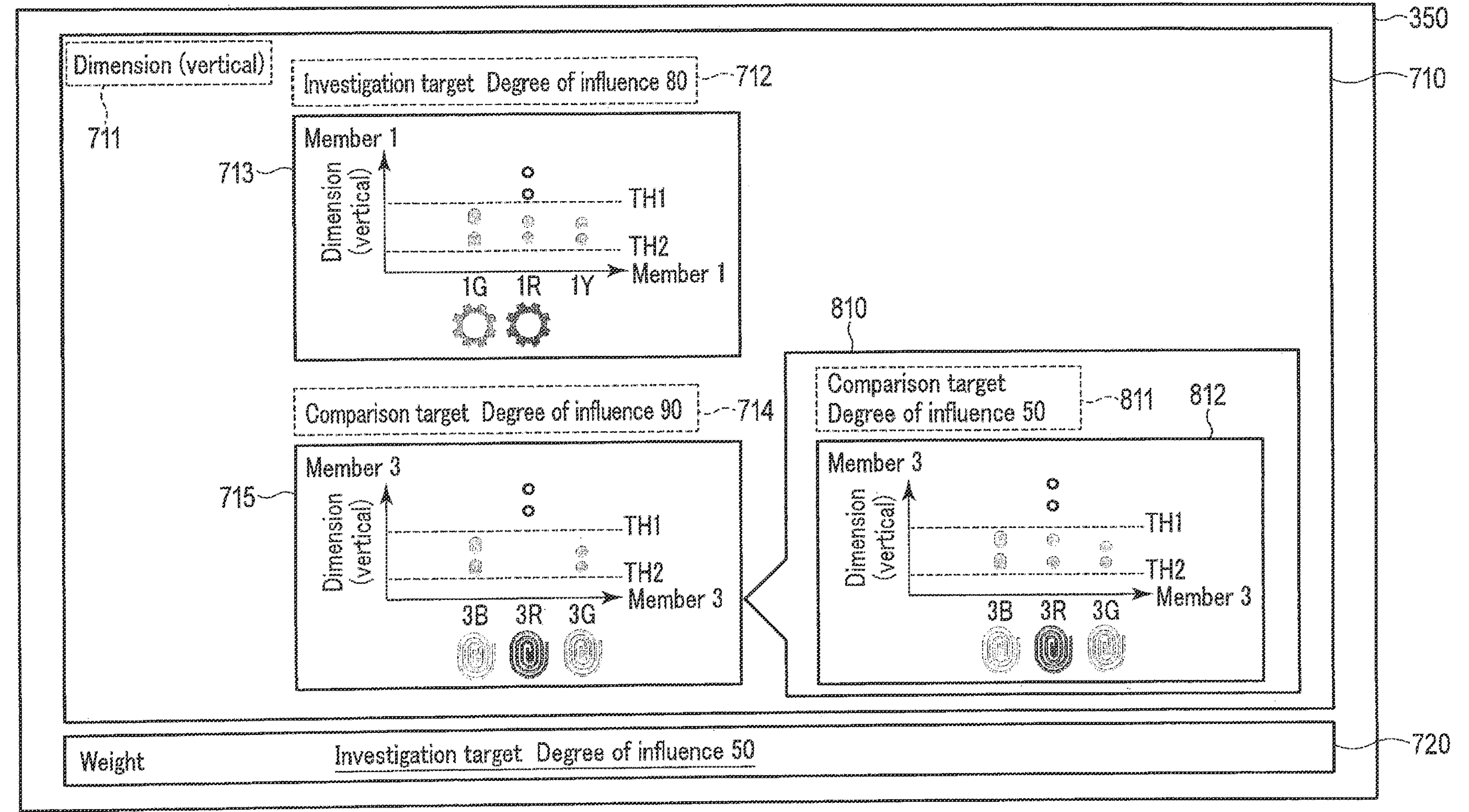
FIG. 16 is a diagram showing a first display example of an image based on output data according to the third embodiment.

FIG. 16 is a diagram showing a first display example of an image based on the output data 250 according to the third embodiment. Here, a first display image 710 including an analysis result of one piece of quality data $y_i$ and a second display image 720 including an analysis result of another piece of quality data $y_i$ are displayed inside the whole display area 350 of the display device 300. Preferably, the first display image 710 and the second display image 720 are arranged in parallel in the whole display area 350 so that the user can easily compare the analysis results in both images.

The first display image 710 includes an area 711 at an upper left edge and areas 712, 713, 714, and 715 near the center. The area 711 displays a data name (dimension (vertical)) of the predetermined quality data $y_i$ to be analyzed (investigated). The area 712 displays a degree of influence S ($y_i$, x) (degree of influence 80) exerted by target manufacturing condition data x (member 1) to be analyzed on the predetermined quality data $y_i$.

In the area 713, a data name (member 1) of the target manufacturing condition data x is displayed at an upper left edge, and as an analysis result of the target manufacturing condition data x and the quality data $y_i$, a scatter diagram based on both pieces of data is displayed near the center. In this scatter diagram, an abscissa axis indicates respective values (member 1G, member 1R, and member 1Y) of the target manufacturing condition data x, and an ordinate axis indicates respective values of the quality data $y_i$. A first threshold value TH1 and a second threshold value TH2, which is smaller than the first threshold value TH1, for the value of the quality data $y_i$ are respectively displayed by dashed lines. In particular, among the plurality of values for the quality data $y_i$, data points indicating values equal to or greater than the first threshold value TH1 are highlighted by being surrounded by a frame line of a predetermined color (e.g., red). With this display mode, the user can easily recognize anomalous values of the quality data $y_i$.

In the area 714, a degree of influence S $$(y_i, x'_j)$$

(degree of influence 90) exerted by comparative manufacturing condition data $$x'_j$$

(member 3) to be compared on the predetermined quality data $y_i$ is displayed.

In the area 715, a data name (member 3) of the comparative manufacturing condition data $$x'_j$$

is displayed at an upper left edge, and as an analysis result of the comparative manufacturing condition data $$x'_j$$

and the quality data $y_i$, a scatter diagram based on both pieces of data is displayed near the center. In this scatter diagram, an abscissa axis shows respective values (member 3B, member 3R, and member 3G) of the comparative manufacturing condition data $$x'_j,$$

and an ordinate axis shows respective values of the quality data $y_i$.

On the right side of the area 715, a second analysis result display image 810 including a second analysis result of a specific piece of quality data $y_i$ (dimension (vertical)) and a specific piece of comparative manufacturing condition data $$x'_j$$

(member 3) is displayed. In this example, the second analysis result display image 810 forms a shape of a speech balloon referring to the area 715.

The second analysis result display image 810 includes an area 811 at an upper portion and an area 812 in the center. The area 811 displays a degree of influence S $$(y_i, x'_j)$$

(degree of influence 50) exerted by the comparative manufacturing condition data $$x'_j$$

(member 3) on the predetermined quality data $y_i$.

In the area 812, a data name (member 3) of the comparative manufacturing condition data $$x'_j$$

is displayed at an upper left edge, and as an analysis result of the comparative manufacturing condition data $$x'_j$$

and the quality data $y_i$, a scatter diagram based on both pieces of data is displayed in the center. Here, in the scatter diagram in the area 812, the number of pieces of data concerning the value "3R" is increased as compared to the scatter diagram in the area 715. That is, as a result of the additional analysis with that increased number of pieces of data, the value of the degree of influence S $$(y_i, x'_j)$$

has changed from "90" to "50" after recalculation.

On the other hand, in the second display image 720, a data name (weight) of the quality data $y_i$ is displayed at the left end, and a degree of influence S ($y_i$, x) (degree of influence 50) of the target manufacturing condition data x (member 1) is displayed near the center. Here, detailed analysis results may be displayed by the user selecting the second display image 720.

Figure 17:
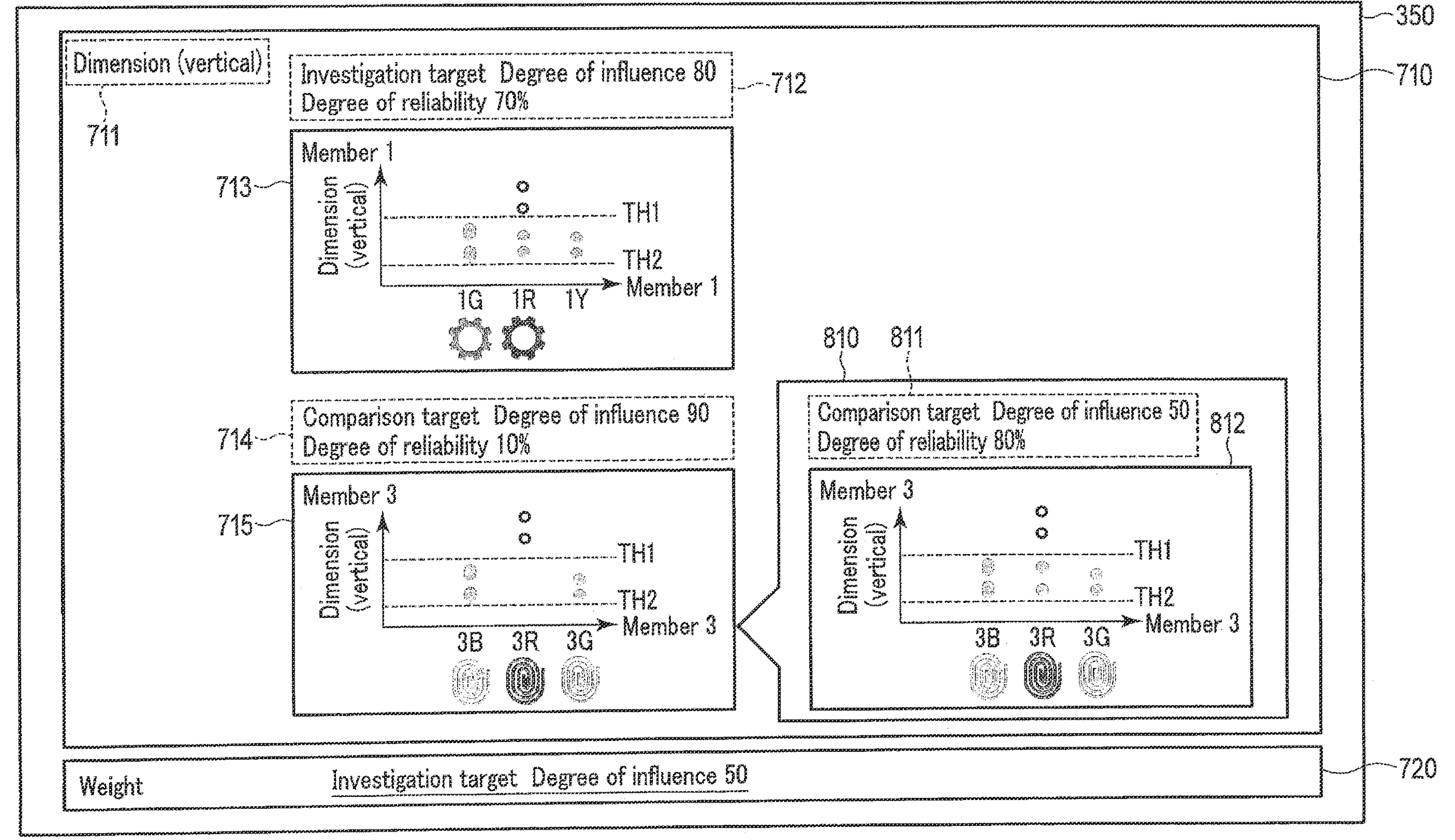
FIG. 17 is a diagram showing a second display example of an image based on output data according to the third embodiment.

FIG. 17 is a diagram showing a second display example of an image based on the output data 250 according to the third embodiment. Unlike the display example in FIG. 16, the display example in FIG. 17 shows a degree of reliability of each analysis result in addition to the values of the degrees of influence S ($y_i$, x) and S $$(y_i, x'_j).$$

The degree of reliability can be calculated based on the number of pieces of data used in the analysis, the number or percentage of missing or anomalous values included in that number of pieces of data, etc.

Firstly, the area 712 displays a degree of reliability (70%) pertaining to the analysis result of the target manufacturing condition data x and the quality data $y_i$. Secondly, the area 714 displays a degree of reliability (10%) pertaining to the analysis result of the comparative manufacturing condition data $$x'_j$$

and the quality data $y_i$. Third, the area 811 displays a degree of reliability (80%) pertaining to the additional analysis result of the comparative manufacturing condition data $$x'_j$$

and the quality data $y_i$. This display mode allows the user to evaluate the degree of reliability of each analysis result.

Figure 18:
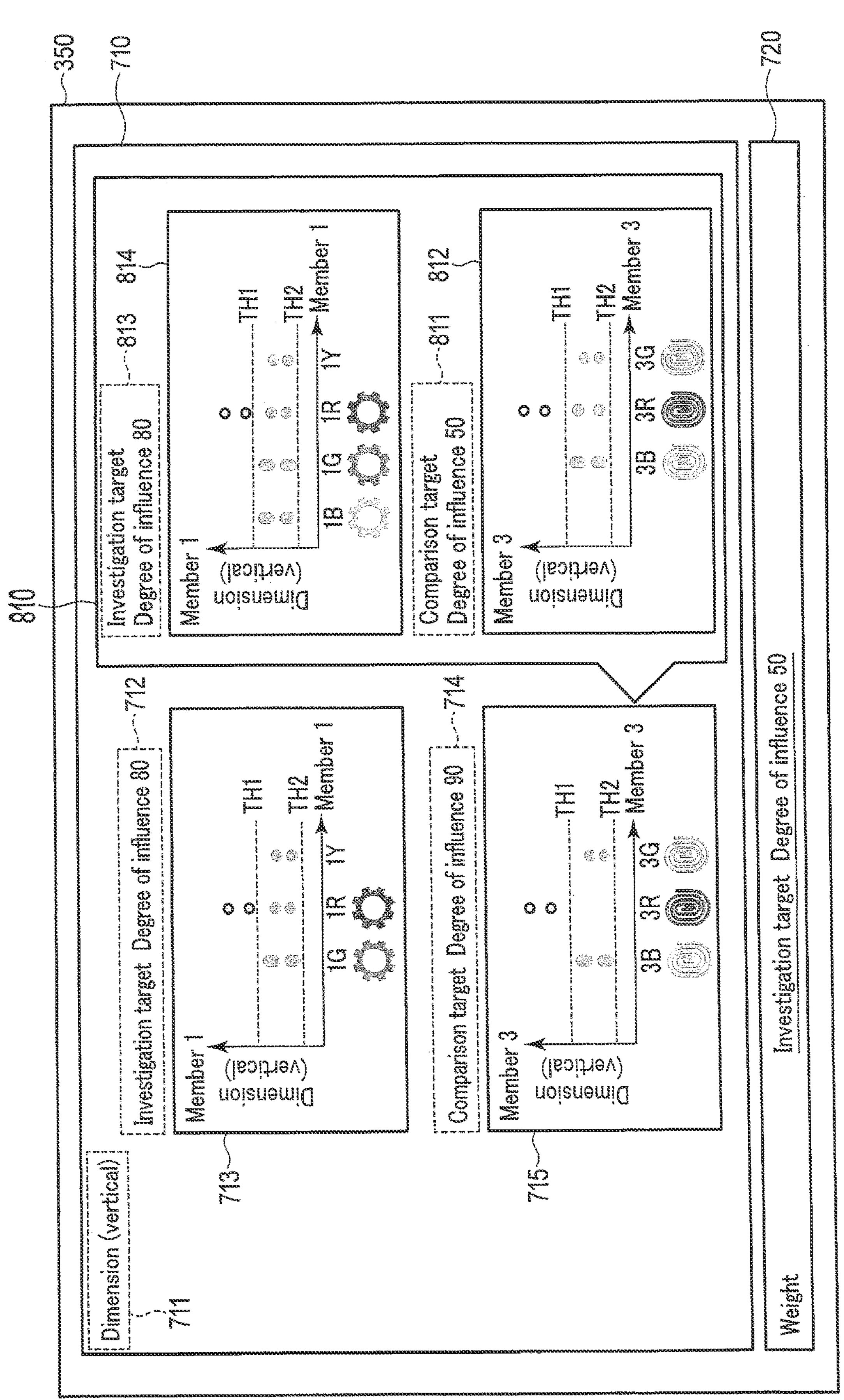
FIG. 18 is a diagram showing a third display example of an image based on output data according to the third embodiment.

FIG. 18 is a diagram showing a third display example of an image based on the output data 250 according to the third embodiment. Unlike the display example in FIG. 16, in the display example in FIG. 18, the second analysis result display image 810 includes areas 813 and 814 in addition to the areas 811 and 812.

In the area 813, a degree of influence S ($y_i$, x) (degree of influence 80) exerted by the target manufacturing condition data x (member 1) to be analyzed (investigated) on the predetermined quality data $y_i$ is displayed.

In the area 814, a data name (member 1) of the target manufacturing condition data x is displayed at an upper left edge, and, as an analysis result of the target manufacturing condition data x and the quality data $y_i$, a scatter diagram based on both pieces of data is displayed near the center. This scatter diagram shows respective values (member 1B, member 1G, member 1R, and member 1Y) of the target manufacturing condition data x, and an ordinate axis indicates respective values of the quality data $y_i$. Here, in the scatter diagram in the area 814, data concerning the new value "1B" is added compared to the scatter diagram in the area 713. That is, the value of the degree of influence S ($y_i$, x) has not changed from "80" after recalculation as a result of an additional analysis with the new data added.

The manufacturing data analysis system 1 according to the third embodiment has been described above. According to the third embodiment, the manufacturing data analysis device 200 determines the second data acquisition condition AC2 with respect to the first data acquisition condition AC1 input by the user, and selects either one or both of the first and second analysis results to generate the output data 250. This allows the manufacturing data analysis device 200 to improve reliability of the analysis result of the relationship between the target manufacturing condition data x and the quality data $y_i$, for example, in a case where the number of pieces of data having some values among the values that the target manufacturing condition data x can take is relatively small. The manufacturing data analysis device 200 according to the third embodiment can also provide the same advantageous effect as that of the first embodiment.

FIG. 19 is a block diagram showing a hardware configuration example of the manufacturing data analysis system 1 of the first to third embodiments. In particular, the manufacturing data analysis device 200 includes processing circuitry 210, a memory 220, an input IF 230, and a communication IF 240 as hardware resources.

The processing circuitry 210 controls the operation of the manufacturing data analysis device 200. The processing circuitry 210 has processors such as a central processing unit (CPU), a micro processing unit (MPU), and a graphics processing unit (GPU) as hardware resources. For example, the processing circuitry 210 executes each program developed in the memory 220 via at least one processor to realize each unit (acquisition unit 211, analysis unit 212, determination unit 213, output data generation unit 214, display data generation unit 215, or acquisition condition determination unit 216) corresponding to each program. Each unit can be realized by processing circuitry 210 consisting of a single processor or a combination of multiple processors.

The memory 220 stores information such as data and programs used by the processing circuitry 210. The memory 220 has a semiconductor memory element such as a random access memory (RAN) as a hardware resource. The memory 220 may be a drive device that reads and writes information from and to an external storage device such as a magnetic disk (floppy (registered trademark) disk, hard disk), a magneto-optical disk (MO), an optical disk (CD, DVD, Blu-ray (registered trademark)), a flash memory (USB flash memory, memory card, SSD) and a magnetic tape. A storage area of the memory 220 may be inside the manufacturing data analysis device 200 or in an external storage device. The memory 220 may store a parameter DB 221. The memory 220 or the parameter DB 221 is an example of a storage unit.

The input IF 230 is an interface that accepts an input from a user of the manufacturing data analysis device 200, converts the accepted input into an electrical signal, and outputs it to the processing circuitry 210. Physical operating components such as a mouse, a keyboard, a trackball, a switch, a button, a joystick, a touch pad, a touch panel display, and a microphone can be used as the input IF 230. The input IF 230 may be a device that accepts an input from an external input device that is separate from the manufacturing data analysis device 200, converts the accepted input into an electrical signal, and outputs it to the processing circuitry 210. The input IF 230 may also accept an input of the parameters 120 by the user, etc. The input IF 230 is an example of an input unit.

The communication IF 240 is an interface that communicates various types of data between the manufacturing data analysis device 200 and external devices. Any communication standard can be used for this data communication. The communication IF 240 is communicably connected to the manufacturing DB 100 and the display device 300. The communication IF 240 is an example of a communication unit.

The display device 300 displays data generated by the manufacturing data analysis device 200, data stored in the memory 220, etc. As the display device 300, for example, a display such as a cathode ray tube (CRT) display, a liquid crystal display (LCD), a plasma display, an organic electroluminescence display (OELD), and a tablet terminal can be used. The display device 300 may be included in the manufacturing data analysis device 200. The display device 300 is an example of a display unit.

In FIGS. 6, 9, and 16 to 18, each value (member 1B, member 1G, member 1R, and member 1Y) included in the target manufacturing condition data x (member 1) is marked with a "gear" icon, while each value (member 3B, member 3R, and member 3G) included in the comparison manufacturing condition data $x'_j$ (member 3) is marked with a "spiral" icon. These icons are attached to the respective values for convenience in explaining the operation of the manufacturing data analysis device 200 according to each embodiment. That is, these icons may not actually be displayed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing data analysis device comprising:

a display device;

processing circuitry operably coupled to a manufacturing data database storing manufacturing data on a plurality of products; and a storage storing a machine learning model trained to output a value of a degree of influence based on input of the manufacturing data, the output of the value of the degree of influence comprising calculating a bias in anomaly rates of the products and selecting a bias rate whose value is largest among calculated bias anomaly rates as the degree of influence, wherein the processing circuitry is configured to:

acquire, from the manufacturing data database under a first acquisition condition, first manufacturing data including a manufacturing condition data group and a quality data group, the manufacturing condition data group including one or more pieces of manufacturing condition data on a value indicating a manufacturing condition for each of the products, and the quality data group including one or more pieces of quality data on a value indicating quality for each of the products;

calculate one or more first degrees of influence exerted by first manufacturing condition data included in the manufacturing condition data group on the respective pieces of quality data included in the quality data group, by performing analysis processing using the stored machine learning model with the first manufacturing data as input;

in a first case where one or more first degrees of influence out of the calculated one or more first degrees of influence satisfy a first determination condition:

generate first output data comprising image data displayable on the display device and including a content related to at least one of the first manufacturing condition data, one or more pieces of first quality data on which the first manufacturing condition data has exerted the first degrees of influence satisfying the first determination condition, or the first degrees of influence satisfying the first determination condition; and calculate one or more second degrees of influence exerted by each piece of second manufacturing condition data on each of the pieces of first quality data, the second manufacturing condition data being included in the manufacturing condition data group and differing from the first manufacturing condition data; and in a second case where one or more second degrees of influence out of the calculated one or more second degrees of influence satisfy a second determination condition, generate second output data comprising image data displayable on the display device and including a content related to at least one of one or more pieces of the second manufacturing condition data that have exerted the second degrees of influence satisfying the second determination condition, one or more pieces of the first quality data on which the one or more pieces of second manufacturing condition data have exerted the second degrees of influence satisfying the second determination condition, or the second degrees of influence satisfying the second determination condition, wherein:

the image data comprising at least one of the first output data or the second output data includes a diagram in which a first axis indicates the manufacturing condition data and a second axis indicates the quality data, the processing circuitry is configured to output the first output data and the second output data to the display device to control the display device to display the first output data and the second output data simultaneously, and the processing circuitry is configured to change a display mode of the image data representing the first output data being displayed on the display device based on a value of the one or more first degrees of influence, and to change a display mode of the image data representing the second output data being displayed on the display device based on a value of the one or more second degrees of influence.

2. The manufacturing data analysis device according to claim 1, wherein the first acquisition condition is information for identifying each individual or group of individuals of the products.

3. The manufacturing data analysis device according to claim 1, wherein the first acquisition condition is at least one value included in at least one of the manufacturing condition data or the quality data.

4. The manufacturing data analysis device according to claim 1, wherein the first output data includes at least one of a name, a value, a representative value, a statistical value, a histogram, or a scatter diagram related to the first manufacturing condition data and the first quality data.

5. The manufacturing data analysis device according to claim 1, wherein the second output data includes at least one of a name, a value, a representative value, a statistical value, a histogram, or a scatter diagram related to the second manufacturing condition data and the first quality data.

6. The manufacturing data analysis device according to claim 1, wherein the processing circuitry is configured to determine that the one or more first degrees of influence satisfy the first determination condition in response to a determination that the one or more first degrees of influence out of the calculated one or more first degrees of influence are equal to or greater than a first threshold value.

7. The manufacturing data analysis device according to claim 1, wherein the processing circuitry is configured to determine that the one or more second degrees of influence satisfy the second determination condition in response to a determination that the one or more second degrees of influence out of the calculated one or more second degrees of influence are equal to or greater than a second threshold value.

8. The manufacturing data analysis device according to claim 7, wherein:

the processing circuitry is configured to determine that the one or more first degrees of influence satisfy the first determination condition in response to a determination that the one or more first degrees of influence out of the calculated one or more first degrees of influence are equal to or greater than a first threshold value, and the second threshold value is equal to or greater than the first threshold value.

9. The manufacturing data analysis device according to claim 1, wherein the processing circuitry is configured to:

generate image data of a setting screen which enables a user to set parameters including at least one of the first acquisition condition, the first manufacturing condition data, the manufacturing condition data group, or the quality data group; and output the image data of the setting screen to the display device to control the display device to display the setting screen.

10. The manufacturing data analysis device according to claim 9, wherein the processing circuitry is configured to generate a list of the parameters based on the manufacturing data, and to generate the image data of the setting screen to include the generated list.

11. The manufacturing data analysis device according to claim 1, wherein:

the processing circuitry is configured to:

determine a second acquisition condition, which is different from the first acquisition condition, based on the first manufacturing data; and acquire the second manufacturing data including the manufacturing condition data group and the quality data group from the manufacturing data under the second acquisition condition; and calculate the first degree of influence and the second degree of influence exerted by the second manufacturing condition data on each of the pieces of quality data, by performing the analysis processing using the stored machine learning model with the first manufacturing data and the second manufacturing data as input.

12. The manufacturing data analysis device according to claim 1, wherein the diagram is a histogram or a scatter diagram.

13. The manufacturing data analysis device according to claim 1, wherein the processing circuitry is configured to determine that the one or more first degrees of influence satisfy the first determination condition in response to a determination that the one or more first degrees of influence out of the calculated one or more first degrees of influence are equal to or greater than a first threshold value.

14. The manufacturing data analysis device according to claim 13, wherein generating the first output data comprises generating, as the image data, image data in which the quality data is highlighted, in response to a determination that a plurality of values related to the quality data are equal to or greater than a threshold value.

15. The manufacturing data analysis device according to claim 1, wherein the processing circuitry is configured to determine that the one or more second degrees of influence satisfy the second determination condition in response to a determination that the one or more second degrees of influence out of the calculated one or more second degrees of influence are equal to or greater than a second threshold value.

16. The manufacturing data analysis device according to claim 15, wherein generating the second output data comprises generating, as the image data, image data in which the quality data is highlighted, in response to a determination that a plurality of values related to the quality data are equal to or greater than a threshold value.

17. The manufacturing data analysis device according to claim 1, wherein the first output data includes, among the image data thereof, image data indicating a warning based on the one or more first degrees of influence.

18. The manufacturing data analysis device according to claim 17, wherein the first output data includes, among the image data thereof, a plurality of characters representing the warning or a highlighted frame border including the warning.

19. The manufacturing data analysis device according to claim 18, wherein the changing the display mode of the image data representing the first output data comprises:

modifying at least one of a font, a color, or a size of the characters being displayed, or changing at least one of a type, a color, or a thickness of the frame border being displayed.

20. The manufacturing data analysis device according to claim 1, wherein the second output data includes, among the image data thereof, image data indicating a warning based on the second degrees of influence.

21. The manufacturing data analysis device according to claim 20, wherein the second output data includes, among the image data thereof, a plurality of characters representing the warning or a highlighted frame border including the warning.

22. The manufacturing data analysis device according to claim 21, wherein the changing the display mode of the image data representing the second output data includes:

modifying at least one of a font, a color, or a size of the characters being displayed, or changing at least one of a type, a color, or a thickness of the frame border being displayed.

23. The manufacturing data analysis device according to claim 1, wherein:

the processing circuitry is configured to:

determine a second acquisition condition, which is different from the first acquisition condition, based on the first manufacturing data;

acquire the second manufacturing data including the manufacturing condition data group and the quality data group from the manufacturing data under the second acquisition condition; and calculate another second degree of influence exerted by the second manufacturing condition data on each of the pieces of quality data, by performing the analysis processing using the stored machine learning model with the second manufacturing data as input.

24. The manufacturing data analysis device according to claim 1, wherein generating at least one of the first output data or the second output data comprises generating, as the image data, image data indicating a degree of reliability of each analysis result.

25. The manufacturing data analysis device according to claim 1, wherein:

the processing circuitry is configured to:

determine a second acquisition condition, which is different from the first acquisition condition, based on the first manufacturing data;

acquire the second manufacturing data including the manufacturing condition data group and the quality data group from the manufacturing data under the second acquisition condition; and calculate another first degree of influence exerted by the first manufacturing condition data on each of the pieces of quality data, by performing the analysis processing using the stored machine learning model with the second manufacturing data as input.

26. A manufacturing data analysis system comprising:

a manufacturing data database storing manufacturing data on a plurality of products;

a manufacturing data analysis device operably coupled to the manufacturing data database; and a display device operably coupled to the manufacturing data analysis device, wherein:

the manufacturing data analysis device includes (i) processing circuitry which is operably coupled to the manufacturing data database, and (ii) a storage storing a machine learning model trained to output a value of a degree of influence based on input of the manufacturing data, the output of the value of the degree of influence comprising calculating a bias in anomaly rates of the products and selecting a bias rate whose value is largest among calculated bias anomaly rates as the degree of influence, the processing circuitry is configured to:

acquire, from the manufacturing data database under a first acquisition condition, first manufacturing data including a manufacturing condition data group and a quality data group, the manufacturing condition data group including one or more pieces of manufacturing condition data on a value indicating a manufacturing condition for each of the products, the quality data group including one or more pieces of quality data on a value indicating quality for each of the products;

calculate one or more first degrees of influence exerted by first manufacturing condition data included in the manufacturing condition data group on the respective pieces of quality data included in the quality data group, by performing analysis processing using the stored machine learning model with the first manufacturing data as input;

in a first case where one or more first degrees of influence out of the calculated one or more first degrees of influence satisfy a first determination condition:

generate first output data comprising image data displayable on the display device and including a content related to at least one of the first manufacturing condition data, one or more pieces of first quality data on which the first manufacturing condition data has exerted the first degrees of influence satisfying the first determination condition, or the first degrees of influence satisfying the first determination condition; and calculate one or more second degrees of influence exerted by each piece of second manufacturing condition data on each of the pieces of first quality data, the second manufacturing condition data being included in the manufacturing condition data group and differing from the first manufacturing condition data; and in a second case where one or more second degrees of influence out of the calculated one or more second degrees of influence satisfy a second determination condition, generate second output data comprising image data displayable on the display device and including a content related to at least one of one or more pieces of the second manufacturing condition data that have exerted the second degrees of influence satisfying the second determination condition, one or more pieces of the first quality data on which the one or more pieces of second manufacturing condition data have exerted the second degrees of influence satisfying the second determination condition, or the second degrees of influence satisfying the second determination condition, the image data comprising at least one of the first output data or the second output data includes a diagram in which a first axis indicates the manufacturing condition data and a second axis indicates the quality data, the processing circuitry is configured to output the first output data and the second output data to the display device to control the display device to display the first output data and the second output data simultaneously, and the processing circuitry is configured to change a display mode of the image data representing the first output data being displayed on the display device based on a value of the one or more first degrees of influence, and to change a display mode of the image data representing the second output data being displayed on the display device based on a value of the one or more second degrees of influence.

27. A manufacturing data analysis method executed under control of processing circuitry operably coupled to a display device, a storage, and a manufacturing information database storing manufacturing data on a plurality of products, the method comprising:

storing, in the storage, a machine learning model trained to output a value of a degree of influence based on input of the manufacturing data, the output of the value of the degree of influence comprising calculating a bias in anomaly rates of the products and selecting a bias rate whose value is largest among calculated bias anomaly rates as the degree of influence;

acquiring, from the manufacturing information database under a first acquisition condition, first manufacturing data including a manufacturing condition data group and a quality data group, the manufacturing condition data group including one or more pieces of manufacturing condition data on a value indicating a manufacturing condition for each of the products, the quality data group including one or more pieces of quality data on a value indicating quality for each of the products;

calculating one or more first degrees of influence exerted by first manufacturing condition data included in the manufacturing condition data group on the respective pieces of quality data included in the quality data group, by performing analysis processing using the stored machine learning model with the first manufacturing data as input;

in a first case where one or more first degrees of influence out of the calculated one or more first degrees of influence satisfy a first determination condition:

generating first output data comprising image data displayable on the display device including a content related to at least one of the first manufacturing condition data, one or more pieces of first quality data on which the first manufacturing condition data has exerted the first degrees of influence satisfying the first determination condition, or the first degrees of influence satisfying the first determination condition; and calculating one or more second degrees of influence exerted by each piece of second manufacturing condition data on each of the pieces of first quality data, the second manufacturing condition data being included in the manufacturing condition data group and differing from the first manufacturing condition data; and in a second case where one or more second degrees of influence out of the calculated one or more second degrees of influence satisfy a second determination condition, generating second output data comprising image data displayable on the display device and including a content related to at least one of one or more pieces of the second manufacturing condition data that have exerted the second degrees of influence satisfying the second determination condition, one or more pieces of the first quality data on which the one or more pieces of second manufacturing condition data have exerted the second degrees of influence satisfying the second determination condition, or the second degrees of influence satisfying the second determination condition, wherein:

the image data comprising at least one of the first output data or the second output data includes a diagram in which a first axis indicates the manufacturing condition data and a second axis indicates the quality data, and the method further comprises:

outputting the first output data and the second output data to the display device to control the display device to display the first output data and the second output data simultaneously, and changing a display mode of the image data representing the first output data being displayed on the display device based on a value of the one or more first degrees of influence, and changing a display mode of the image data representing the second output data being displayed on the display device based on a value of the one or more second degrees of influence.

* * * * *